(12) United States Patent
Terrell et al.

(10) Patent No.: US 7,389,399 B2
(45) Date of Patent: Jun. 17, 2008

(54) SECURE VIRTUAL INTERFACE

(75) Inventors: William C. Terrell, Thousand Oaks, CA (US); Tracy Edmonds, Camarillo, CA (US); Wayland Jeong, Agoura Hills, CA (US); Arvind Krishnan, Thousand Oaks, CA (US); Gordon Larimer, Agoura Hills, CA (US)

(73) Assignee: QLOGIC, Corporation, Aliso Viejo, CA (US)

( * ) Notice: Subject to any disclaimer, the term of this patent is extended or adjusted under 35 U.S.C. 154(b) by 400 days.

(21) Appl. No.: 11/070,858

(22) Filed: Mar. 1, 2005

(65) Prior Publication Data

US 2007/0033413 A1 Feb. 8, 2007

Related U.S. Application Data

(63) Continuation of application No. 09/755,642, filed on Jan. 4, 2001, now Pat. No. 6,883,099.

(51) Int. Cl.
*G06F 12/00* (2006.01)
(52) U.S. Cl. .................................................. 711/203
(58) Field of Classification Search ................ 711/203, 711/206
See application file for complete search history.

(56) References Cited

U.S. PATENT DOCUMENTS 6,601,146 B2 * 7/2003 Auslander et al. .......... 711/147
2001/0044904 A1 * 11/2001 Berg et al. .................. 713/201

* cited by examiner

*Primary Examiner*—Hiep T Nguyen
(74) *Attorney, Agent, or Firm*—Klein, O'Neill & Singh, LLP

(57) ABSTRACT

A network interface for secure virtual interface data communication includes a doorbell circuit, a processor, memory, and a bridge circuit. The doorbell circuit responds to physical I/O addresses of the host that are mapped by a memory management unit by a registration process. An application program seeking to use a channel of a virtual interface must register the virtual address of host memory where data for communication is or will be stored and register the virtual address of a page of I/O addresses. Access to the doorbell functions and to the host memory via the memory management unit are therefore denied when the requesting process identifier does not successfully compare with the process identifier for the process that performed the registrations. A password may be stored in the network interface in association with a virtual interface (VI) channel identifier and stored in association with the virtual to physical map used for VI communication. The network interface may abandon a requested or implied data communication when passwords so not successfully compare. Methods for virtual interface (VI) communication performed by an application program may include one or more of the steps of (a) establishing a VI channel where physical I/O addresses of a network controller are secured; (b) registering host memory for use with a VI channel where physical memory addresses are secured; (c) describing blocks of host memory with reference to a memory handle; and (d) accomplishing data communication of a described block of host memory via an established VI channel where the data and controls of the VI channel are secured and the data and controls of other VI channels are secured. Security is provided against both erroneous operations and operations intentionally effected by rouge processes.

2 Claims, 9 Drawing Sheets

US 7,389,399 B2

SECURE VIRTUAL INTERFACE

PRIORITY REFERENCE TO PRIOR APPLICATION

This application claims benefit of and is a continuation of U.S. patent application Ser. No. 09/755,642, filed on Jan. 4, 2001 now U.S. Pat. No. 6,883,099, which is hereby incorporated by reference.

FIELD OF THE INVENTION

Embodiments of the present invention relate to providing the data of a first application program to another application program where the application programs are separated by network communication hardware. Methods and apparatus of the present invention provide security in a network communication environment to reduce the possibility of unexpected operation of application programs, especially when other application programs are not currently operating in an environment that can be trusted by the first application program

BACKGROUND OF THE INVENTION

Network data communication between computers allows a first application program to access the data of a second application program. In conventional application-to-application communication, the time spent passing messages between applications includes the overhead of crossing interfaces between the operating system, a device driver, and the network interface hardware. These overhead functions have been reduced to some extent by an interface design of the type referred to generally as virtual interface (VI) and described for example in "Virtual Interface Architecture Specification", Version 1.0, Dec. 16, 1997, Compaq Computer Corp., Intel Corp., Microsoft Corps., pp. 1-83. A conventional VI is implemented with a network interface controller in the computer that hosts the first application and a second network interface controller in the computer that hosts the second application. Each network interface controller maintains work queues for transmit and receive functions.

Conventional protection mechanisms do not provide sufficient isolation between application programs. In particular, it is desirable to prevent access to work queues except by the application program that is primarily associated with such work queues. Inadvertent or intentional access and modification of work queues may initiate a chain of events that leads to improperly overwriting data or program storage with the possibility of erroneous program results, unreliable computer operation, and/or unstable network conditions

SUMMARY OF THE INVENTION

A system for secure data communication, according to various aspects of the present invention includes a processor, a host memory circuit, a memory management circuit, and a network interface. The processor provides a first virtual address, a second virtual address, and a process identifier to the memory management unit. The host memory circuit is coupled to the processor. The first virtual address corresponding to a first physical address of the host memory. The memory management circuit (MMU) includes an MMU memory circuit in operation containing indicia of a first association of the first virtual address, the first physical address, and the process identifier, and a second association of the second virtual address, the second physical address, and the process identifier. The memory management circuit provides the first physical address in response to receiving the first physical address and the process identifier, and provides the second physical address in response to receiving the second physical address and the process identifier. The network interface includes a third memory, a command interface circuit, and a bridge circuit. The third memory circuit in operation containing indicia of a third association of the first virtual address and the first physical address; a fourth association of the second physical address and the first physical address. The command interface circuit provides a signal in response to receiving the second physical address and the first virtual address. The bridge circuit couples the system to a computer network for data communication. The bridge circuit includes an interface circuit that couples the system to a provided network for data communication. The bridge circuit is operative, in response to the signal, to obtain the first physical address from the third memory circuit as addressed in accordance with the first virtual address; and to transfer data between the interface circuit and the first memory circuit as addressed by the first physical address for data communication.

A method for data communication according to various aspects of the present invention is performed by a first computer for communication with a second computer. The method includes the steps in any order of (a) creating a password; (b) establishing a data communication channel with the second computer, the channel being identified by a channel identifier; (c) associating the password with the channel identifier; (d) creating a first map that associates a plurality of virtual I/O addresses with a plurality of physical I/O addresses; (e) associating the first map with a process, the process identified by a process identifier, (f) requiring the process identifier for accessing the first map; (g) creating a second map that associates a plurality of virtual memory addresses with a plurality of physical memory addresses; (h) determining a memory handle in accordance with a virtual address of the second map; (i) associating the password and the memory handle with the second map; (j) requiring the password for accessing the second map; and (k) communicating via the channel data identified in accordance with the memory handle.

A method for transmitting data onto a network according to various aspects of the present invention includes the steps in any order of: (a) providing a memory handle corresponding to a registered virtual memory address, data at the virtual memory address for transmission onto the network; (b) issuing a command with reference to a registered virtual I/O address; (c) determining, in response to the command, a physical memory address in accordance with the memory handle; and (d) transmitting data that was read in accordance with the physical memory address.

A method for data communication according to various aspects of the present invention includes the steps in any order of (a) performing, by a central processor, an I/O write instruction for effecting data communication by a network controller, the I/O write instruction associated with a process identifier, the instruction comprising a registered doorbell virtual page number, an operation identifier, and a registered virtual memory address, each registered address being associated with the process identifier; (b) permitting conversion of the doorbell virtual page number to a doorbell physical page number in accordance with the process identifier; (c) associating the registered virtual memory address, the doorbell physical page number, and a password; (d) permitting conversion of the registered virtual memory address to a physical memory address in accordance with the password; and (e) performing data communication as effected by the I/O write instruction in accordance with data read in accordance with the physical memory address.

A method for data communication according to various aspects of the present invention is performed by a network interface of a first computer. The first computer includes a first memory. The network interface includes a second memory. The method includes in any order the steps of (a) receiving a channel identifier; (b) obtaining from a first data structure of the second memory a first password and a physical address of a description of a block to send, the first data structure accessible in accordance with the channel identifier; (c) obtaining from a second data structure of the first memory a memory handle and a first virtual address referring to the first memory, the second data structure accessible in accordance with the physical address of the description of the block to send; (d) determining an index value in accordance with the memory handle and the first virtual address; (e) obtaining from a third data structure of the second memory a second password and a first physical address corresponding to the first virtual address, the third data s accessible in accordance with the index value; (f) abandoning data communication if the first password does not compare successfully with the second password; and (g) engaging in data communication with reference to the first physical address.

A data structure according to various aspects of the present invention is maintained in a network interface. The network interface is installed in a host computer. The data structure includes a plurality of entries. Each entry includes a physical address of a page of memory of the host computer; a password; and a validity flag. The entries in the data structure are addressable by an index value. The index value is determined in accordance with a sum of a memory handle and a virtual address of a page of memory of the host computer. The virtual address corresponds to the physical address.

A data structure according to various aspects of the present invention is maintained in a network interface. The network interface is installed in a host computer. The network interface is for data communication via a plurality of channels. The data structure includes a plurality of entries. Each entry includes a first physical I/O address of the host computer, a password, and a second physical memory address of the host computer. The first physical I/O address is for addressing the network interface. The second physical memory address of the host computer is for identifying data for communication by the network interface. Entries in the data structure are addressable by a channel identifier. The channel identifier is for identifying a particular channel of the plurality of channels for data communication.

BRIEF DESCRIPTION OF THE DRAWING

Embodiments of the present invention will now be further described with reference to the drawing, wherein like designations denote like elements, and.

DETAILED DESCRIPTION OF PREFERRED EMBODIMENTS

Figure 1:
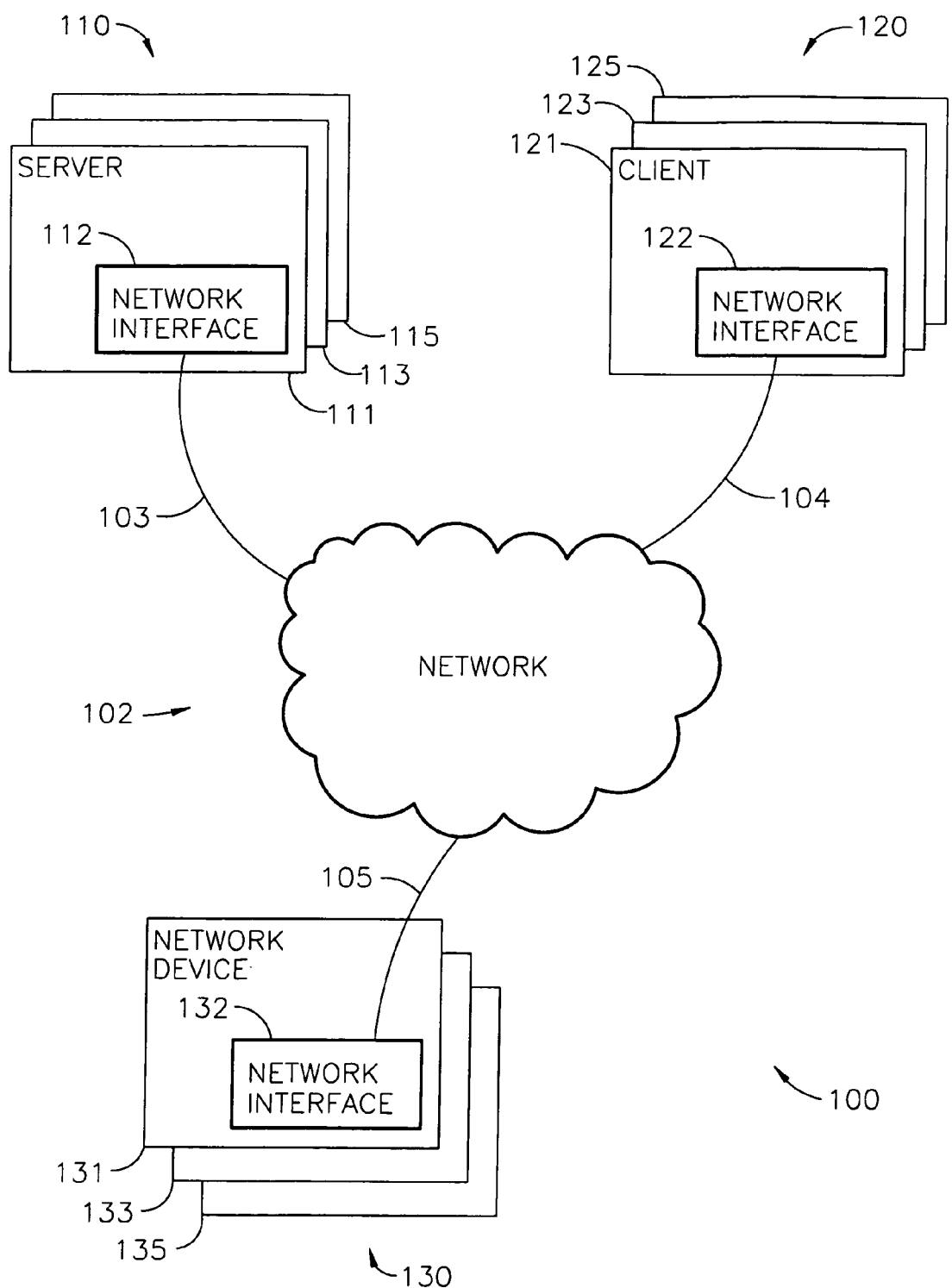
FIG. 1 is a functional block diagram of a data communication network according to various aspects of the present invention.

A system according to various aspects of the present invention may include any computing environment supporting two or more application programs that communicate. The system provides secure application-to-application communication between application programs that are not necessarily trustworthy; and, provides each application program security from any third application program that may be operated to snoop, interfere with, or otherwise disturb the secure application-to-application communication or reliability of operations. In one relatively simple implementation, one computer may host two application programs that communicate. The computer in this application may be a general purpose computer (e.g., a desk-top computer used for office functions) or a special purpose computer (e.g., part of a network traffic router or firewall). In another, implementation any number of servers, clients, and network devices, communicate via a network supporting communication between any number of application programs hosted on one or more of the servers, clients, and/or network devices. For example, system 100 of FIG. 1 includes network, 102, servers 110, clients 120, and network devices 130.

Network 102 may be any data communication facility. In one implementation network 102 includes a point-to-point facility for communication between two network nodes, each node being one computer system. As discussed above, these two network nodes may alternately be provided on one computer. In other implementations, network 102 may include any local area network, wide area network, wired or wireless network, connection oriented or connection-less network. Proprietary or standard communication protocols may be used on the facility including any protocols associated with the Open Systems Interconnect model physical, data link, and sessions layers. In a preferred implementation, network 102 is compatible with the Internet and World Wide Web and uses TCP/IP protocol at the session layer. Network 102 may be non-homogeneous, for example, comprising a variety of links between and among servers 110, clients 120, and network devices 130, each link having a respective protocol stack from the physical layer on up that may differ in one or more respects from other links of network 102. The physical location of servers, clients, and network devices is not shown on FIG. 1 and may include any number of sites (e.g., stationary, mobile, and temporary sites) each having any mix of servers, clients, and network devices.

Servers 110 provide data storage and application hosting to support conventional distributed processing application programs. Server functions may include web site hosting, application service provision, internet service provision, transcoding, firewall operations, and data mining support, to name a few representative functions. Servers 110 include physically separate computer systems 111, 113, and 115 that may operate relatively independently of each other and other portions of system 100, and/or may cooperate. Server 111 may cooperate with any number of clients 120 and/or any number of network devices 130. Three servers are shown merely for convenience of discussion. Each server 111, 113, 115 may include a network interface 112 that provides at least physical layer connectivity to network 102. Each server (e.g., 111) may include any computer equipment (e.g., conventional microprocessor based desk-top computer and peripherals), any operating system (e.g., Windows NT marketed by Microsoft Corp.), any application programs (e.g., conventional commercial, business, and scientific applications), and software providing an interface for server functions to be implemented via the network interface (e.g., 112).

Clients 120 provide data storage and application hosting to support conventional distributed processing application programs, and in addition, provide an operator interface (e.g. a graphical user interface (GUI)). Client functions may include browsing information from servers 110 via network 102 and network devices 130, performing application programs (including distributed processing application programs) for commercial and scientific purposes. Clients 120 include physically separate computer systems 121, 123, and 125 that may operate relatively independently of each other and other portions of system 100, and/or may cooperate. Client 121 may cooperate with any number of clients 120 and/or any number of network devices 130. Clients 120 and servers 110 may cooperate for conventional client/server applications and/or peer-to-peer applications. Three clients are shown merely for convenience of discussion. Each client 121, 123, 125 may include a network interface 122 that provides at least physical layer connectivity to network 102. Each client (e.g., 121) may include any computer equipment (e.g., conventional microprocessor based desk-top computer and peripherals), any operating system (e.g., Windows NT marketed by Microsoft Corp.), any application programs (e.g., conventional commercial, business, and scientific applications), and software providing an interface for client functions to be implemented via the network interface (e.g., 122).

Network devices 130 provide network interconnection and gateway functions generally transparent to (but necessary for) conventional distributed processing application programs. Network device functions may include data routing, forwarding, temporary storage, transcoding, protocol conversion, directory services, network monitoring, network configuration management, and firewall operations, to name a few representative functions. Network devices 130 include physically separate computer systems 131, 133, and 135 that may operate relatively independently of each other and other portions of system 100, and/or may cooperate (e.g, for fail-over, redundant capacity, parallel processing, or backup processing). Network device 131 may cooperate with any number of server 110 and/or any number of clients 120. Three network devices are shown merely for convenience of discussion. Each network device 131, 133, 135 may include a network interface 112 that provides at least physical layer connectivity to network 102. Each network device (e.g., 131) may include any computer equipment (e.g., conventional microprocessor based voice, data, and video switching subsystems), any operating system (e.g., Linux marketed by Red Hat Inc.), any application programs (e.g., conventional network services programs), and software providing an interface for network device functions to be implemented via the network interface (e.g., 112).

Any one server, client, or network device of system 100 may include several network interfaces 112, 122, 132 for firewall functions, fail-over capability, or increased data communication throughput.

Servers 110, clients 120, and network devices 130 may communicate on other networks in addition to network 102. Communication via network interfaces and network 102 provides secure provision and access to data among nodes of network 102. Such data may be further provided or accessed via other networks, may be used to control application programs that use such other networks, or used to control functions of such other networks.

A network interface according to various aspects of the present invention copies data stored in memory used by one application program to memory used by another application program. The memory may be in one computer (or address space) or in the address spaces of different computers. The memory may be registers, cache, primary, or secondary storage (e.g., disk). An application program may initiate the allowing of access to data it uses and initiate accessing data used by other application programs.

Data is identified by the application program according to its virtual address. The virtual addresses specified m an application program are generally relative to the value of a base register maintained by the operating system and a map maintained by a memory management unit (MMU). The map may serve as a cross reference for conversion of a virtual address to a physical address at the instant the virtual address is demanded from the memory. Conversion may be accomplished or ranges of contiguous memory addresses called pages. By definition, a virtual page comprises virtual addresses; and, a physical page comprises physical addresses. Based and mapped memory techniques facilitate dynamically relocating the memory used by an application program, for example, in response to the many demands for memory that arise during execution of several application programs in a time shared manner. When an application demands use of a large contiguous block of primary memory, the operating system and MMU may cooperate to copy physical pages to disk, move physical pages together (i.e., defragment the memory), and permit use of the resulting contiguous block of memory by the requesting application program.

In addition to such based and mapped memory addressing, the operating system and the host computer circuitry may have other protection facilities for providing security between application programs. These techniques may include use of an access table, use of protection modes, and use of an input/output (I/O) bus separate from the memory bus. For example, the operating system may identify application programs or their components with an identifier (e.g., a process ID). An MMU may include an access table having an association for each process ID that describes a range of virtual addresses (i.e., a page) and a list of access privileges (e.g., access flags). An access flag may be any number of bits, preferably one bit per privilege (e.g., read, write, execute). If an application program demands conversion of a virtual address to a physical address and the physical address is not associated with appropriate access privileges associated with the requesting application program's process ID, then the MMU may generate an interrupt that passes control to the operating system, and the operating system may terminate execution of the offending application program. A processor having protection mode technology may include a flag that, if not set, causes an interrupt in response to attempted execution of one of a protected set of instructions. Instructions in the set may include register I/O instructions for modifying registers in the processor (e.g., the protection mode flag, interrupt controls, registers for based memory references), registers in the MMU (e.g., to establish an access table value, or to establish a map translation value), and registers in any I/O device controller. A register is a memory device that, because of particular computer circuitry, is not part of a computer's general purpose memory. Processor circuits may define an I/O bus for communication between the processor and I/O device controllers. The I/O bus may include an I/O address (e.g., port address) bus and a data bus separate from the address bus and data bus between processor and memory. Data to or from a register of an I/O device may then be accessed via a virtual I/O address. Conversion of virtual I/O addresses used by privileged application programs to physical I/O addresses used on the I/O bus itself may be made by the operating system, the MMU, a bridge between the buses, or a combination of these. When conversion is accomplished by an MMU and an application program demands conversion of a virtual I/O address to a physical I/O address and the physical I/O address is not associated with appropriate access privileges associated with the requesting application program's process ID, then the MMU may generate an interrupt that passes control to the operating system, and the operating system may terminate execution of the offending application program. Access to the I/O address space may be further restricted by protection mode techniques.

A network interface, according to various aspects of the present invention, permits a first application program running on a first computer to initiate copying data stored in memory used by the first application program to memory used by a second application program in a secure manner and provides protection from inappropriate modification of the memory used by the operating system and application programs running on the first computer. Various alternate implementations of the network interface may use in any combination the dynamic addressing and protection facilities discussed above.

A system of the type discussed above with reference to FIG. 1 may include two host computers coupled by a network. For example, system 200, of FIG. 2, includes host 212 and host 242, each coupled to network 202. Each host may be an instance of a server 111, a client 121, or a network device 131 in any combination. Network 202 may be of the type discussed above with reference to network 102. Components of each host may be identical in structure and function and may cooperate to perform respective operating systems and respective pluralities of application programs as discussed above. Each host 212 (242) may include a central processing unit (CPU) 214 (244), a system bus 216 (246), an MMU 218 (248), host memory 220 (250), an I/O bridge 222 (252), an I/O bus 224 (254), a network interface 226 (256), and a link from network interface 226 (256) to network 202.

A CPU provides circuits for the execution of instructions generally fetched from memory and typically affecting the values stored in registers and memory of the host. For example, CPU 214 may include a Pentium processor marketed by Intel, Inc. Any CPU may be used. Preferably, CPU 214 supports dynamic addressing, protection modes, and seperate buses for system functions (e.g., a host memory) and I/O functions (e.g., a network interface).

Host memory provides apparatus (e.g., circuits and conventional memory devices including disks) for the storage of instructions and data of the operating system, application programs, and device drivers. Any conventional semiconductor memory circuits may be used.

A memory management circuit supports a map and/or an access table, as discussed above. The operating system may control the memory management circuit by register I/O instructions that may in addition affect the contents of the map and/or access table as discussed above. Any conventional memory management circuit may be used, including circuitry integrated to any extent with CPU 214 or host memory 220. Access to host memory by I/O devices (e.g., direct memory access circuits of network interface 226) may be made by an I/O device. For example, MMU 218 monitors system bus 216 for such access attempts and provides conversion of virtual memory addresses to physical memory addresses as needed. MMU 218 may interrupt an access attempt when process ID (e.g., a device ID) and access flags are not previously set to appropriate values prior to an access attempt.

System bus 216 includes circuits and signal paths permitting CPU 214, MMU 218, host memory 220, and I/O bridge 222 to communicate in any conventional manner. System bus 216 may include any conventional address, data, and control signal lines. In operation, CPU 214 may present a virtual address to MMU 218 via line 215; MMU may after conversion present a corresponding physical address to host memory 220 via line 219 and system bus 216; and read or write data may be coupled between CPU 214 and host memory 220 via lines 217 and system bus 216. System bus 216 may thereby convey physical memory addresses. When MMU 218 provides conversion for I/O addresses, system bus 216 also conveys physical I/O addresses. Otherwise, virtual I/O addresses may be conveyed by system bus 216 to I/O bridge 222; I/O bridge 222 may perform conversion; and corresponding physical I/O addresses may be conveyed on I/O bus 224.

I/O bus 224 includes circuits and signal paths permitting CPU 214, MMU 218, and host memory 220 to communicate in any conventional manner with network interface 226 as well as any other I/O devices, not shown, coupled to I/O bus 224. Preferably, I/O bridge comprises at least one member of a conventional chip set implementing I/O bus 224 in accordance with a conventional PCI-bus specification.

A network interface according to various aspects of the present invention may include any combination of circuitry and software (e.g., firmware) suitable for performing functions discussed herein. For example, a network interface in one implementation for use with a host computer includes application software executed by the host, operating system software executed by the host, a network controller having a processor, and a control program executed by the processor.

Figure 3:
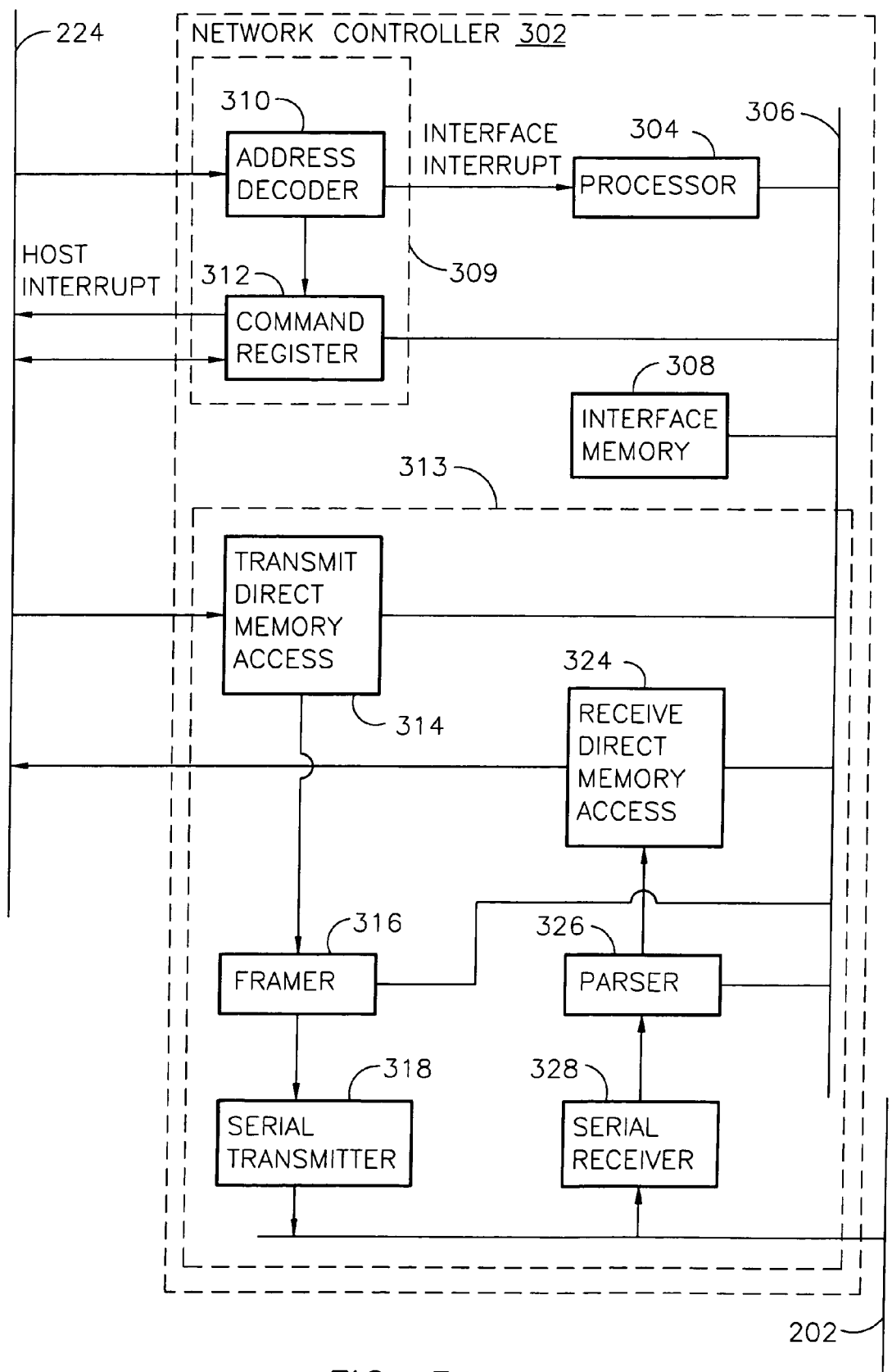
FIG. 3 is a functional block diagram of a network interface of FIG. 2.

In one implementation, such a network interface includes a network controller, a virtual interface (VI) device driver, and a VI application programming interface (API). The network controller may include a processor, an interface memory for storage of, inter alia, a control program executed by the processor, an interface to the host for responding to commands from the host, and a bridge circuit between the host and the network that (as directed by the processor to a suitable extent) accomplishes protocol conversions for a suitable number of layers of the OSI model (e.g., the physical, data link, and session layers). For example, network controller 302, of FIG. 3, includes 304, interface memory 308, host command interface 309, and bridge circuit 313. Bridge circuit 313 includes transmit direct memory access (DMA) circuit 314, framer 316, serial transmitter 318, serial receiver 328, parser 326, and receive DMA circuit 324. The structure and functions of the components will be described below after an overview of the functions of the VI device driver and the VI API.

According to various aspects of the present invention, an application program may open a VI channel with reference to a VI channel identifier and a password and then use the VI channel with reference to a memory handle and the password. The application program uses VI communication without knowledge of physical I/O addresses (e.g., used to control the VI channel) or physical memory addresses (e.g., for its own data or for the data used on other VI channels or used by other application programs).

In a preferred implementation, the VI API, the VI device driver, and the control program cooperate to perform, inter alia, methods that include one or more of the following steps: (a) creating a password initially known only by one application program, the password for allowing that application to selectively grant other applications access to a VI channel by conveying knowledge of the password to other applications; (b) associating the password with an identifier of a VI channel; (c) establishing communication with another host computer on the identified VI channel; (d) mapping a range of virtual I/O addresses to physical I/O addresses; (e) associating the I/O map of the previous step to a process identifier and to one or more privileged operations for purposes of limiting access to the I/O map to the identified process and for limiting access by the identified process to only the privileged operations; (f) mapping a range of virtual memory addresses to physical memory addresses; (g) associating the password and a memory handle with the memory map of the previous step to limit access to processes that have knowledge of the password; and (h) communicating via the identified VI channel data associated with the memory handle. In step (e) associating process identifier with a virtual address, herein also called registering a virtual address, may be implemented by a memory managing unit.

After a VI channel has been established, an application program having suitable access to the channel may determine values in a block of memory to send via the VI channel and may direct that the data be sent. The VI API and the control program may cooperate to perform methods that include, inter alia, one or more of the following steps: (a) providing a memory handle corresponding to a range of registered virtual memory addresses having data to send via the VI channel; (b) directing the network controller to send data read with reference to the memory handle by issuing a command made with reference to a registered virtual I/O address; (c) converting the virtual I/O address to a physical I/O address; (d) obtaining physical memory addresses corresponding to the memory handle; (e) reading from the physical memory addresses the data for sending; (f) framing messages that include the data to send; and (g) transmit the messages via the network.

After a VI channel has been established, an application program having suitable access to the channel may prepare a block of memory to receive data via the VI channel and may direct that data be received. The network API and the control program may cooperate to perform methods that include, inter alia, one or more of the following steps: (a) providing a memory handle corresponding to a range of registered virtual memory addresses having data to be modified by data received via the VI channel; (b) directing the network controller to receive data and write it with reference to the memory handle by issuing a command made with reference to a registered virtual I/O address (c) converting the virtual I/O address to a physical I/O address; (d) obtaining physical memory addresses corresponding to the memory handle; (e) receiving messages via the network; and (f) parsing the messages to obtain received data; and (g) writing the received data into the physical memory addresses.

A processor, as discussed above, includes any conventional computing circuit that performs a program from memory. For example, processor 304 cooperates with interface memory 308 to perform functions of the control program discussed above. Processor may include a dedicated microcontroller, a microprocessor. Components of network controller 302 including processor 304 may be integrated as a chip set, hybrid, or integrated circuit. Processor 304 manages interface bus 306 to which processor 304, command interface 309, interface memory 308, and bridge 313 are coupled.

Interface memory provides storage for the control program and related data. Any conventional types and organizations of memory circuitry may be used. For example, interface memory 308 may include FLASH EPROM for program storage, SDRAM for cache, and multiported DRAM for data storage.

A command interface includes circuitry for receiving command signals from a conventional bus and for decoding such signals to provide data for storage in an interface memory and control signals to a processor. For example, command interface 309 accepts register I/O commands from I/O bus 312; and, accepts commands similar in some respects to memory mapped I/O commands. Command interface 309 may consist of conventional logic circuitry of the type known as doorbell circuitry.

Command interface 309 includes address decoder 310 and command register 312. Bus read and bus write operations via bus 224 effect register I/O functions on command register 312. Command register 312 may include several data registers that provide status (via read operations of bus 224) and accept configuration values (via a write operations of bus 224).

In addition, address decoder 310 monitors the address bus portion of bus 224 to detect particular physical I/O addresses that indicate commands to network controller 302. A physical I/O address on bus 224 may occur as part of either a read or write operation. On occurrence of a particular physical I/O address (with or without reference to the data portion of the read or write operation) address decoder 310 may generate a signal to one or more circuits of network controller 302. For example, physical I/O addresses occurrence and detection by address decoder 310 may give rise to a host interrupt generated by command register 312, give rise to an interface interrupt to processor 304, initiate a sequence of events (e.g., controlled by processor 304 and/or memory access circuits 314 and 324) to transfer data between any of host memory 220, command resister 312, interface memory 308, framer 316, and parser 326.

An I/O instruction as executed by CPU 214 gives rise to activity on an address portion and a data portion of the I/O bus. In a system where I/O operations may be preempted, it may be desirable to avoid passing data by an I/O instruction in a manner that permits the system to deliver the data out of order to the network interface. One way to avoid this result is to implement several I/O instructions each with a portion of the data necessary for a complete action by the network interface.

Table 1 lists exemplary operations of command interface 309 in a preferred implementation.

TABLE 1

| COMMAND and Contents of I/O Bus | Command Description |
| --- | --- |
| INITIATE TRANSMITTING - The address portion of the bus (e.g., 32 bits) contains a doorbell physical page number (e.g., 20 bits) and an operation identifier (e.g., 10 bits). The data portion of the bus (e.g., one or more cycles of 32 bits per cycle) contains indicia of the a memory handle (e.g., to implement data security), a virtual address (e.g., of a first BlockToSendDescriptor in a linked list), and may contain bits reserved for auxiliary functions. The virtual address may include a virtual page number (e.g., 20 bits) and an offset (e.g., 12 bits) from the page boundary indicated by the virtual page number. The offset may be fewer bits for chunks of memory having a binary multiple of addresses (e.g., 6 bits for reference to a 64-word chunk). The memory handle and a position of the virtual address (e.g., a virtual page number) may be combined as an index (e.g., an AptIndex having 18 bits) as discussed below. | This command supplies sufficient information for a network interface to begin transmitting data over an established VI channel. As discussed below, for example, PostToSend process 411 may issue this command and ReviseQueueContext process 450 may take action in response to this command. When the doorbell physical address is already associated with a particular VI channel, explicit reference to the VI channel number may be omitted (as here). |
| INITIATE RECEIVING- The address portion of the bus (e.g., 32 bits) contains a doorbell physical page number (e.g., 20 bits) and an operation identifier (e.g., 10 bits). The data portion of the bus (e.g., one or more cycles of 32 bits per cycle) contains indicia of the a memory handle (e.g., to implement data security), a virtual address (e.g., of a first BlockToReceiveDescriptor in a linked list), and may contain bits reserved for auxiliary functions. The virtual address may include a virtual page number (e.g., 20 bits) and an offset (e.g., 12 bits) from the page boundary indicated by the virtual page number. The offset may be fewer bits for chunks of memory having a binary multiple of addresses (e.g., 6 bits for reference to a 64-word chunk). The memory handle and a portion of the virtual address (e.g., a virtual page number) may be combined as an index (e.g., an AptIndex having 18 bits) as discussed below. | This command supplies sufficient information for a network interface to begin storing received data in host memory from an established VI channel. As discussed below, for example, PostToReceive process 414 may issue this command and ReviseQueueContext process 450 may take action in response to this command. When the doorbell physical address is already associated with a particular VI channel, explicit reference to the VI channel number may be omitted (as here). |

Command interface 310 may cooperate with processor 304 to determine to which VI channel (if any) the command applies. In one implementation, the I/O address space of the address bus portion of bus I/O bus 224, is segmented into I/O address pages. Page size may be configured by one or more values written by register I/O operations to command register 312. The addresses of each page apply respectively to each VI channel. Preferably, the command and suitable parametric values that further define the subjects, functions, or objects of a command (if needed) may be stored in a command queue in host memory 220. Processor 304 may review the command queue in response to an interface interrupt or regularly by a conventional polling technique. In addition, for commands that apply to host memory that is associated with a memory handle, data provided as part of a write operation as discussed above may include indicia of the memory handle and may serve to identify a physical memory address and/or password associated with the memory handle.

A bridge circuit performs, inter alia, protocol conversion (e.g., at the data link and physical layers) to convey data between an I/O bus and the network. For example, bridge circuit 313 is coupled to I/O bus 224 for performing conventional bus read and write operations. Bridge circuit 313 is also coupled to network 202 to send and receive messages in serial. Bridge circuit 313 may cooperate with processor 304 to accomplish error detection, generation of acknowledgements, and retransmission of packets received in error. To achieve desired throughput or to accommodate desired different protocols, network controller 302 may include any suitable number of bridge circuits.

A DMA circuit according to various aspects of the present invention (such as transmit DMA circuit 314 and receive DMA circuit 324) applies read or write operations on an I/O bus to successive physical memory addresses to effectively transfer data stored in a range of physical memory addresses between host memory and a network. A DMA circuit may include registers and logic for determining suitable physical addresses through indirect references and for providing status of operations. Such registers may be subject to register I/O operations of a processor. For example, transmit DMA circuit 314 is coupled to buses 224 and 306; and to framer 316. Receive DMA circuit 324 is coupled to buses 224 and 306; and to parser 326. Communication on busses 224 and 306 among DMA circuits, framer and parser may follow conventional techniques.

Blocks 314 and 324 may be implemented to perform, in addition to functions discussed above, some or all of the functions discussed below with reference to DirectTransmitDMA process 453 and DirectReceiveDMA process 457 may be implemented with circuitry in addition to or in place of software (or firmware) for speed, reliability, and/or cost benefits. In particular, security check functions may be implemented in circuitry.

A framer receives data from a DMA circuit and prepares message packets to be sent on a network. For example, framer 316 receives data read from host memory 220 by DMA First 314 and prepares messages according to TCP/IP for network 202. Framer 316 may include registers subject to register I/O commands from processor 304 via bus 306. Framer 316 may include conventional pipeline memory and cyclic redundancy check code calculation circuits.

Serial transmitter 318 parallel message packet information from framer 316 and provides on network 202 serial data that may include any signal features specified by the protocols to be used on network 202.

Serial receiver 328 receives serial data from network 202 and provides parallel message packet information to parser 326. Serial receiver may also detect errors in serial data and provide status signals to parser 326.

A parser receives parallel message data from a serial receiver circuit and determines what action is to be taken with respect to the received data. For relatively low level control operations, such as when initially establishing a connection on the network, the message data may be passed via a bus to memory or a processor without analysis by the parser. For relatively high levels of control operations, such as during data communications, a parser may provide data to a DMA circuit; or, discard data and initiate transmitting a request for retransmission of a packet received in error. Such initiation may include raising an interrupt to a processor, writing status to a register or memory to be polled by a processor, or signaling a framer to send a relatively predetermined message (e.g., an acknowledgement with packet number, a go-back-N request, etc.). A parser may determine from the message content to which VI channel the message applies. A parser may also ignore messages that apply to VI channels that are indicated (e.g., by a register, memory, or processor) as to be ignored. For example, parser 326 receives message data from serial receiver 328 and provides data to DMA circuit 324. Parser 326 is coupled to bus 306 for register I/O operations and for access to memory 308 and possibly framer 316. Parser 326 may include pipeline registers or memory for buffering data received or provided by parser 326.

Methods for virtual interface communication performed by an application program according to various aspects of the present invention may include one or more of the steps of (a) establishing a VI channel where physical I/O addresses of a network controller are secured (e.g., MMU and I/O operations permitted to be performed only by the operating system or installed device drivers; doorbell operations permitted to be performed only by processes registered with the doorbell virtual address); (b) registering host memory for use with a VI channel where physical memory addresses are secured; (c) describing blocks of host memory with reference to a memory handle; and (d) accomplishing data communication of a described block of host memory via an established VI channel where the data and controls of the VI channel are secured and the data and controls of other VI channels are secured. Data and controls may be secured as to other processes when such data and/or controls are inaccessible to other processes as a practical matter. Inaccessible as a practical matter affords security against both erroneous operations and operations intentionally effected by rouge processes. Such methods may support an unlimited number of application programs using any combination of VI channels (e.g., exclusive use, multiple shared use, parallel or redundant use, or currently not in use yet ready for a fail-over or increase in capacity) and may support any mix of VI channel configurations including: null (e.g., store and forward), one-to-one, one-to-many, many-to-one, and many-to-many. Security as discussed herein significantly reduces the possibility of interference between application programs.

For example, an implementation of a distributed processing environment that performs such methods (FIGS. 4A-E) may be hosted on a computer 212 and include an application program address space 400, an operating system address space 420, and a control program address space 440. CPU 214 refers to address space 400 for execution of application program 401 and a VI program library 402. VI program library (VIPL) 402 includes subroutines (e.g., objects) that are linked for execution with application program 401. For clarity, other portions of application program 401 including those that refer to VIPL 402 are not shown. CPU 214 refers to address space 420 for execution of operating system 421 and VI kernel agent 422. VI kernel agent (VIKA) 422 includes subroutines (e.g., objects) that are installed for execution with operating system 421. In one implementation, VIKA 422 is installed as a device driver supporting network controller 302. Processor 304 refers to address space 440 for execution of network interface control program 441, an implementation of a control program as discussed above.

Each application program executed by CPU 214 may be provided a proprietary address space by operating system 421. Application program address space 400 of FIGS. 4A-E represents just one application program address space for application program 401. Space 400 includes processes of VIPL 402 including: CreateTag process 403, CreateVi process 404, MakeConnection process 405, RegisterHostMemory process 406, DescribeBlockToSend process 409, PostToSend process 411, DescribeBlockToReceive process 412, and PostToReceive process 414. Space 400 also includes data structures for the storage of information for use primarily by application program 401 and VIPL 402. Data structures include: ViTable 430, BlockToSend 407, BlockToReceive 408, TransmitWorkQueue 410, and ReceiveWorkQueue 413. When instructions for VIPL 402 processes are designed in a conventional re-entrant manner, any number of application programs may use the same VIPL process instructions, conserving space in host memory 220. Alternately, each application program (e.g., 401 and others not shown) may have a copy of the instructions of VIPL 402 to ensure proprietary information and the execution context of one application program is not subject to inappropriate access by another application program.

DescribeBlockToSend process 409 and/or DescribeBlockToReceive process 412 may be implemented as part of VIPL 402 (as shown) or may be implemented in an ad hoc manner when each application program is developed.

Figure 4A:
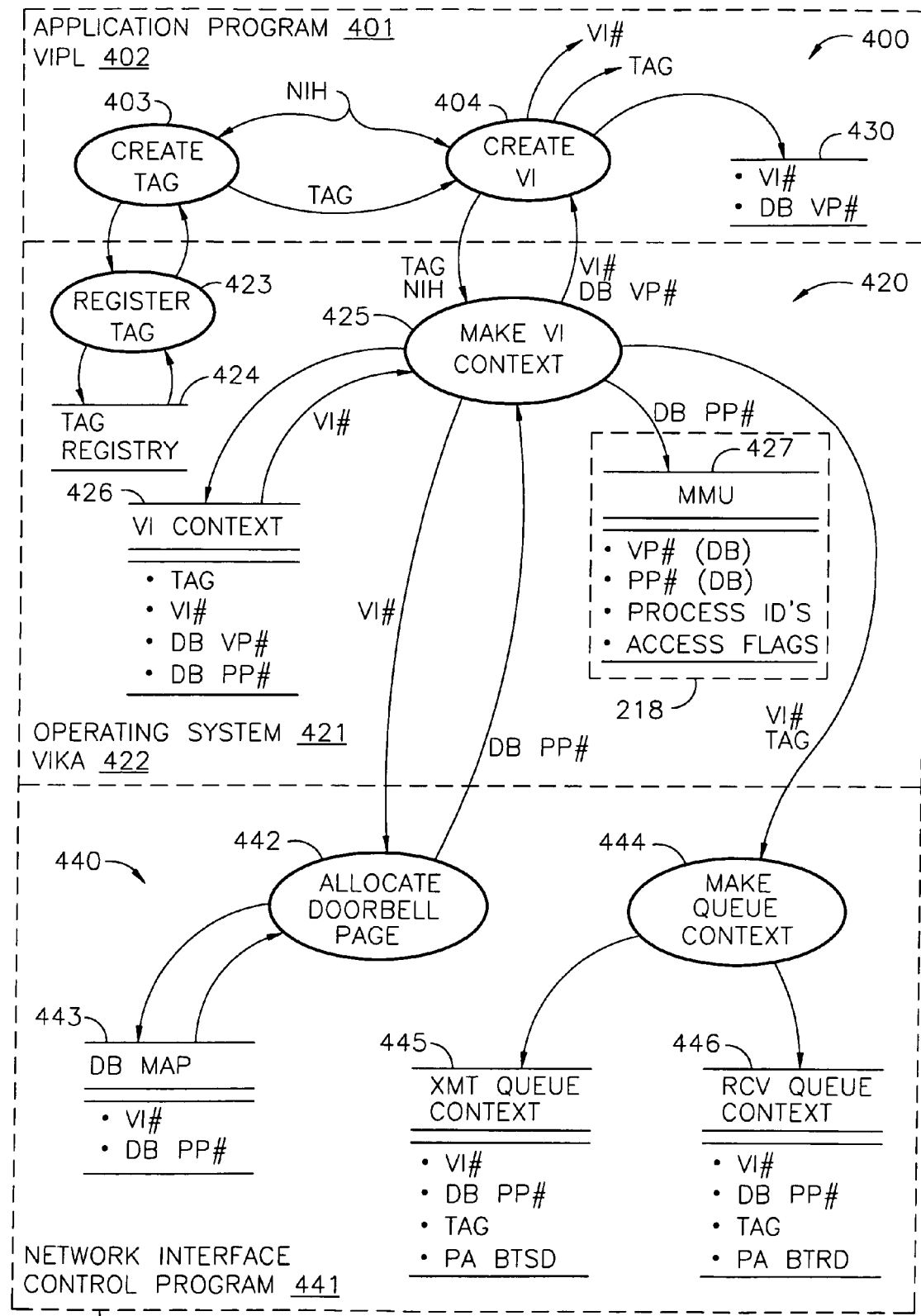
FIGS. 4A-4E form a data flow diagram of methods for establishing and using a secure virtual interface according to various aspects of the present invention.
Figure 4B:
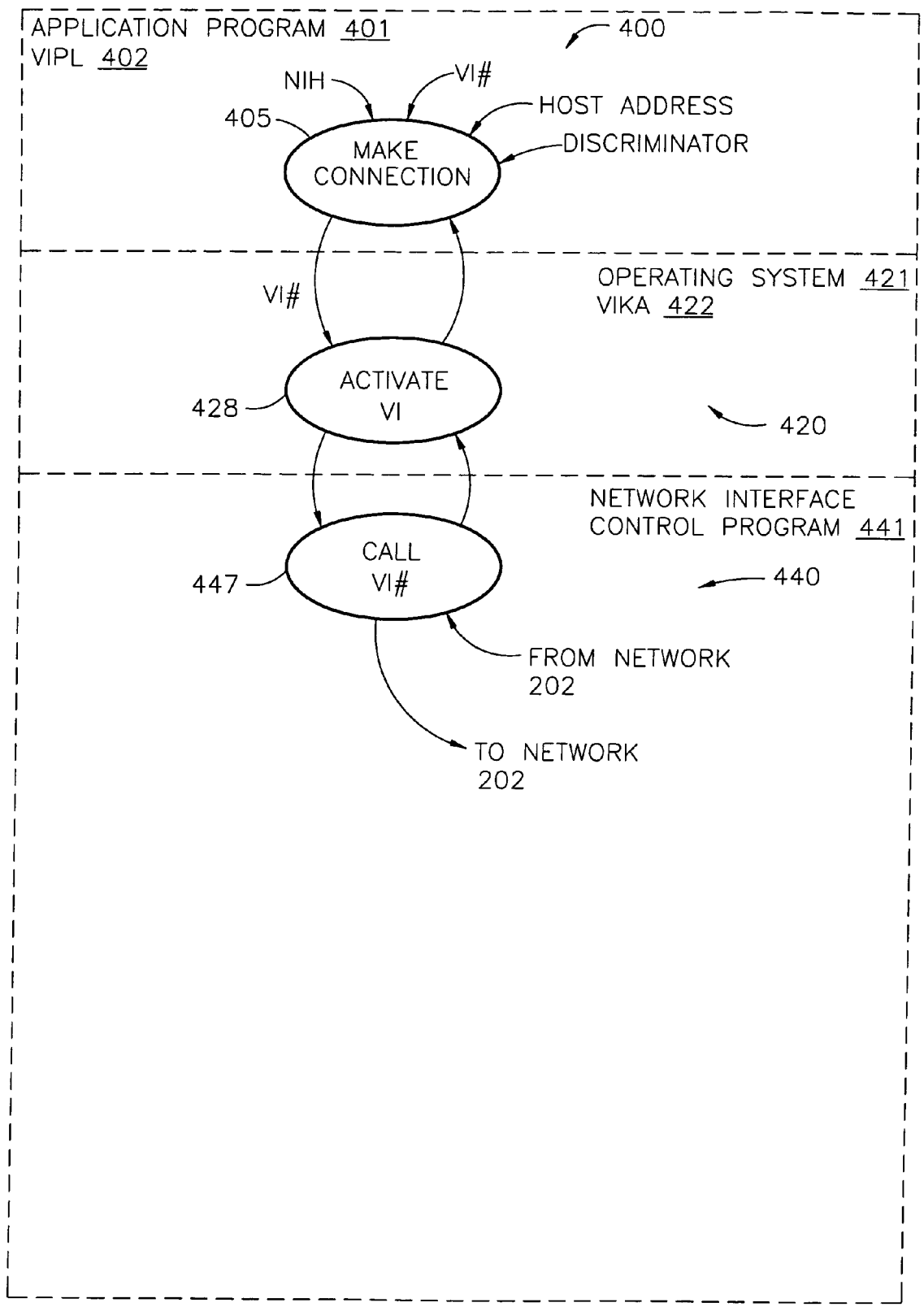
Figure 4C:
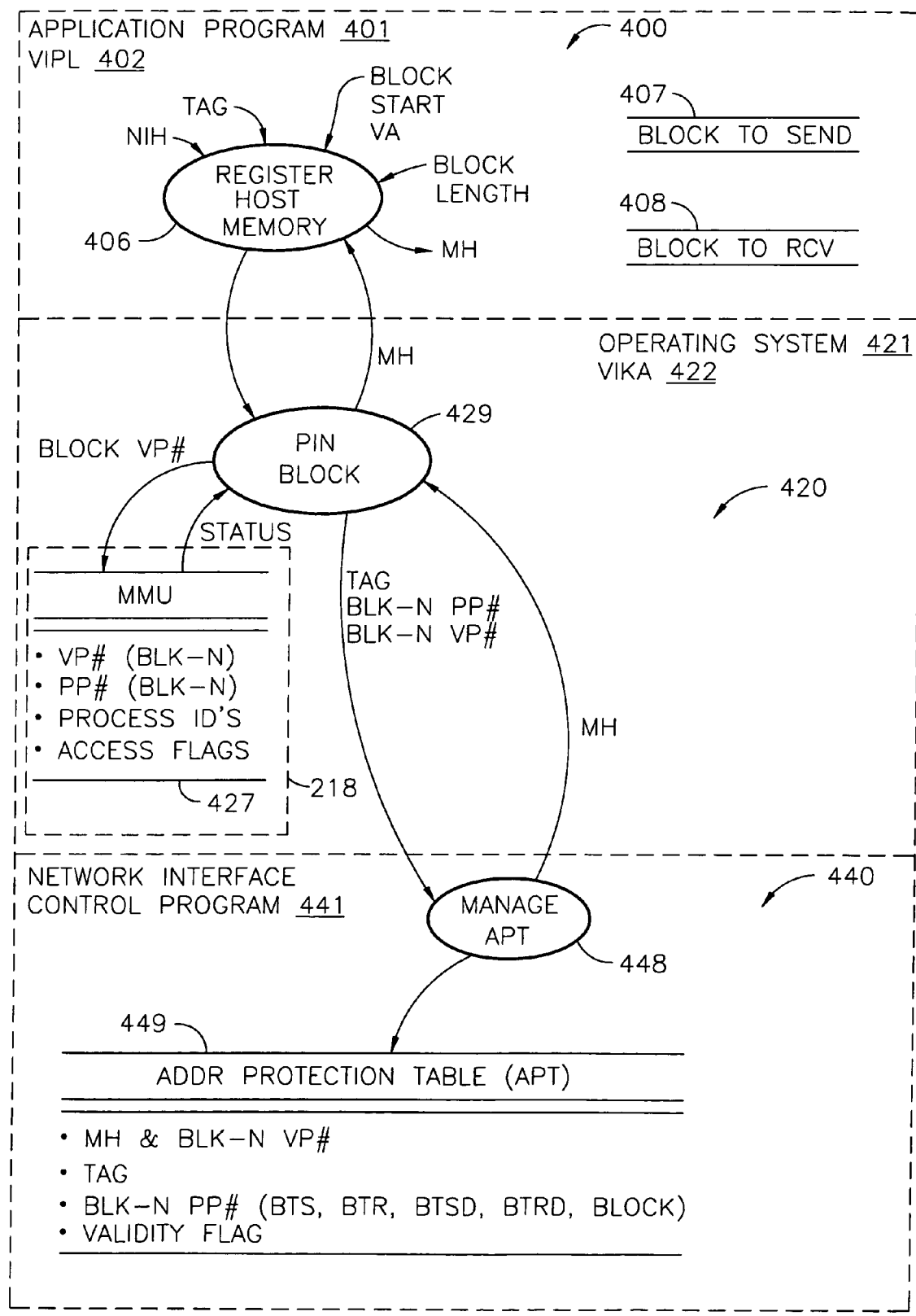
Figure 4D:
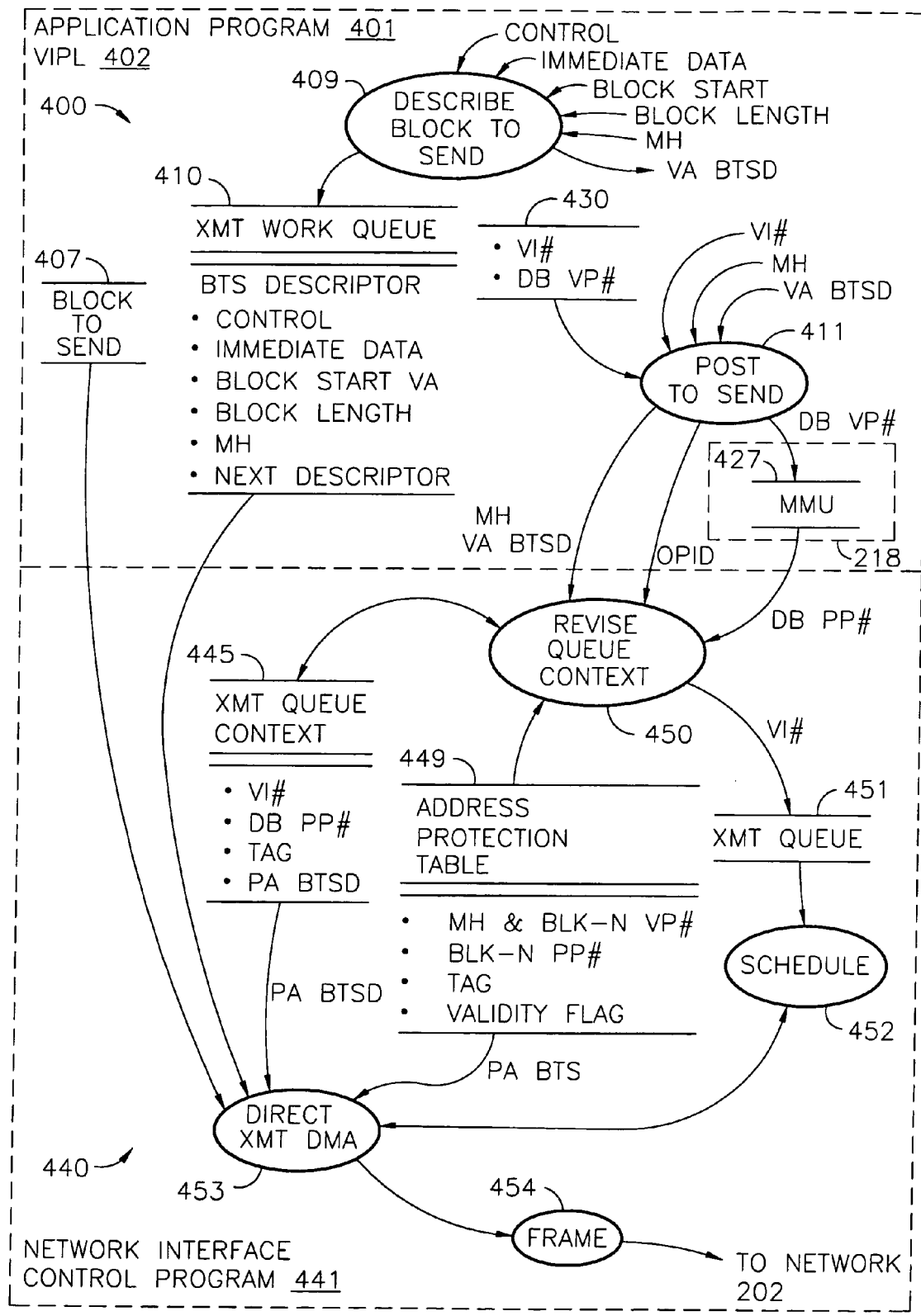
Figure 4E:
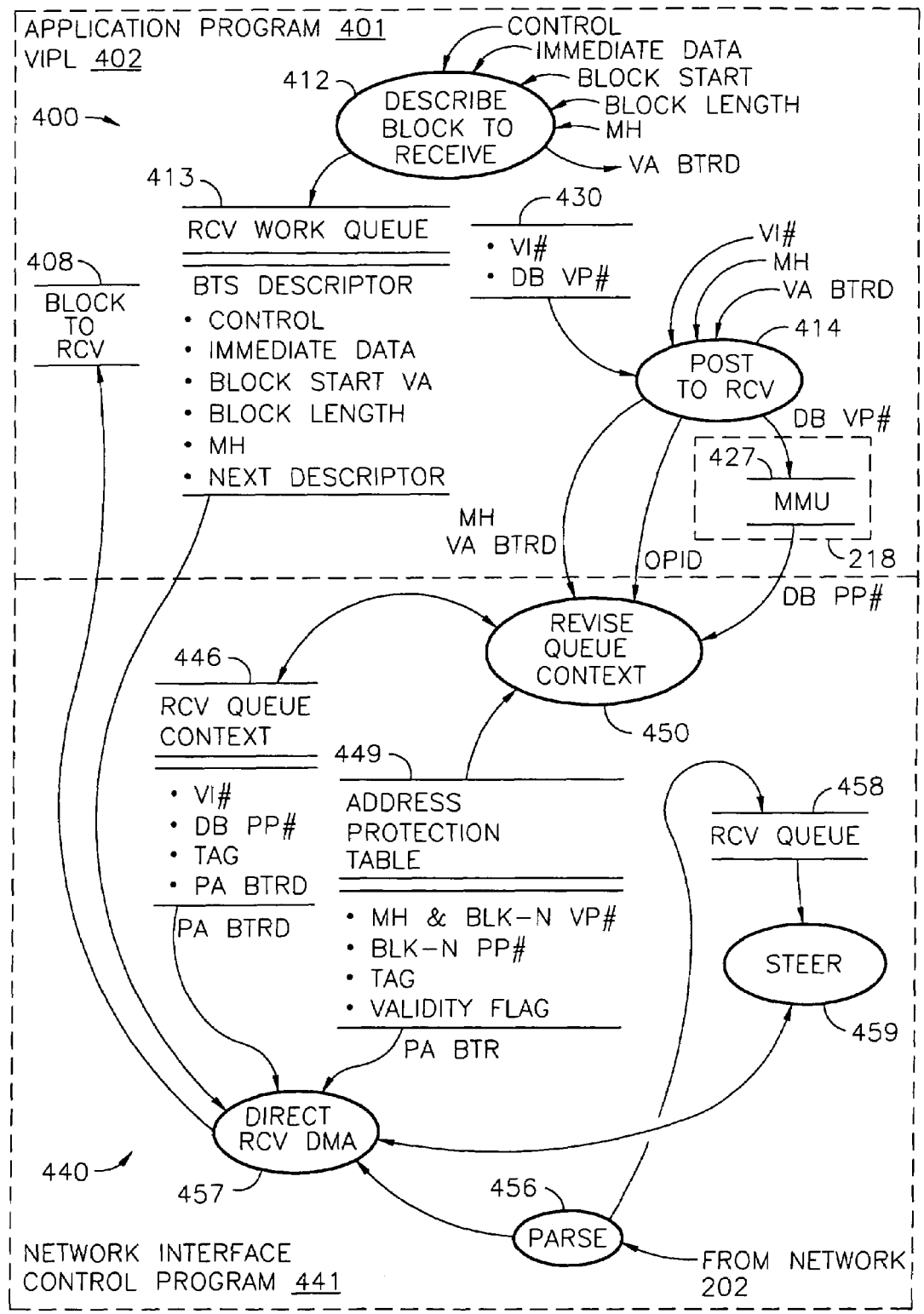

Operating sync address space 420 of FIGS. 4A-C includes operating systems processes 421 (not shown in detail) and processes of VIKA 422 as follows that may be installed in a conventional manner as a device driver. VIKA 422 includes RegisterTag process 423, Make ViContext process 425, ActivateVi process 428, and PinBlock process 429. Space 420 also includes data structures for the storage of information for use primarily by VIKA 422. Data structures include: TagRegistry 424 and ViContext 426.

MMU table 427 is preferably implemented in a conventional manner in memory associated exclusively with a memory management unit (MMU) such as MMU 218. MMU table 427 may be read and/or written by CPU 214 using conventional register I/O techniques using buses 217, 216 and 219. When CPU 214 refers to a virtual address in an instruction, MMU 218 refers to MMU table 427 for address translation and authorization, receiving a virtual address on bus 215 and providing (if authorized) a physical address on bus 219 during execution of the instruction.

Network interface control program address space 440 of FIGS. 4A-E includes the following processes: AllocateDoorbellPage process 442, MakeQueucContext process 444, CallVi process 447, ManageApt process 448, ReviseQueueContext process 450, Schedule process 452, DirectTransmitDma process 453, Frame process 454, Parse process 456, DirectRecieveDma process 457, and Steer process 459. Space 440 also includes data structures for the storage of information for use primarily, and preferably exclusively, by control program 441. Data structures include: DbMap 443, TransmitQueueContext 445, ReceiveQueueContext 446, AddressProtectionTable 449, TransmitQueue 451, and Receivequeue 458.

Figure 2:
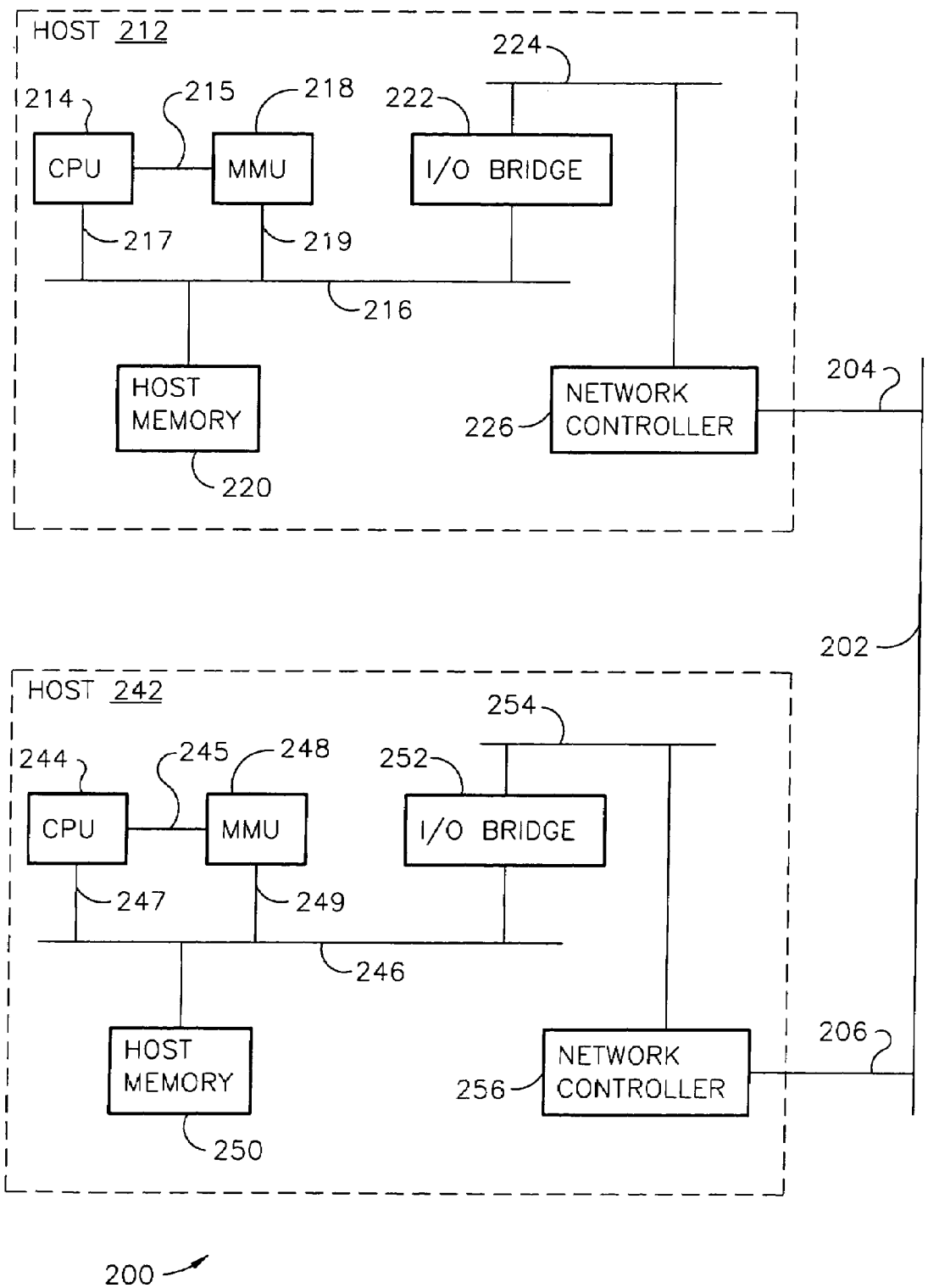
FIG. 2 is a functional block diagram of two network nodes of the system of FIG. 1.

For convenience of description of the methods and processes discussed above, consider application 401 as currently executing on host 212 of FIG. 2 and desiring to communicate with host 242 via network 202. Host 212 has network controller 226 identified to application program 401 by a suitable network interface handle (e.g., as typically used to uniquely designate and control a particular network controller when multiple network controllers have been installed on an I/O bus).

Flow of data along the arrows shown in FIGS. 4A-E may be accomplished (a) by shared variables, parameter passing (by value or by reference), or any conventional interprocess communication facility (e.g., RPC); or (b) by register I/O. In a preferred implementation, communication across the interface between space 400 and space 420 is accomplished by system calls (e.g, as conventionally used to access an installed device driver); and, communication across the interface between space 420 and 440 is accomplished by register I/O and a command queue.

A suitable command queue is established in host memory 220 and a memory read/write facility is added to network interface control program 441. CPU 214 may then write host memory 220 with data for processor 304. Processor 304 may read the command queue at any convenient time and from time to time to perform commands. In addition, CPU 214 may present a command with one parametric value (e.g., "ring the doorbell" so to speak) to alert processor 304 to take immediate action with reference to the command queue or to take a particular action specified or implicated by the particular command (e.g., in accordance with which of several doorbells was rung, with the presented parametric value, or both).

To establish a VI channel where physical I/O addresses of a network controller are secured (e.g., inaccessible as a practical matter), an application program may, inter alia, obtain a password, create a context for the VI communication, and request opening of a VI channel associated with the password. For example, application program 401 may provide a network interface handle to CreateTag process 403 and receive a password (e.g, a tag, an operating system object reference, any unique identifier). Application program 401 may then provide the network interface handle and the password to CreateVi process 404 and receive a VI channel identifier (e.g., VI#). Finally, application program 401 may provide the network interface handle, the VI channel identifier; a discriminator, and an address of another host computer coupled to network 202 (e.g., host 242) to MakeConnection process 405 and receive confirmation that a VI channel has been established.

A process that provides a password includes any process that provides a unique value (e.g., a number, character string, object reference, etc.). Uniqueness may be accomplished by maintaining a list of all passwords that have been provided, by generating a number from a long or pseudo-random series that has little risk of being reissued while a formerly issued password is still in use, or any conventional method. For example, CreateTag process 403 may present a request to RegisterTag process 423 that a new tag be registered. RegisterTag process 423 may determine a new tag value and may further compare the new value to entries in TagRegistry 424. If found in TagRegistry 424, the new value is discarded and another new value is determined and tested until not found. The successfully tested new value may then be entered into TagRegistry 424 by RegisterTag process 423 and returned to CreateTag process 403. TagRegistry 424 may include entries for all Tags issued for use by any application program executed on host 212. Tags may be derived with reference to or include indicia of network interface handle and/or VI identifier to assure uniqueness within the scope of one network interface controller or more generally. Tags that are no longer in use may be removed from TagRegistry 424 by any suitable process, for example, as a consequence of initialization, an error condition, or organized cessation of use of the Tag by as many application programs as have knowledge of it.

The value of a password may be provided to any application program(s) that may have need to use it for VI communication. A group of programs may thereby share a communication channel. Because a password may be kept in one application program's address space (e.g., space 400 for application program 401), operating system 421 and MMU 218 may make its location and/or value practically inaccessible to another application program for unauthorized discovery and/or use.

A process that establishes a context for subsequent VI communication includes any process that associates one or more of a password, a VI channel identifier and a virtual or physical I/O address used to control a network controller. For example, CreateVI process 404 provides a password and network interface handle to MakeViContext process 425. MakeViContext determines proposed VI channel identifier by proposing a VI channel number and then verifying that the proposed VI channel identifier is unique by making a query of ViContext 426. In an alternate implementation, MakeViContext requests a unique VI channel identifier from control program 441. MakeViContext may present the proposed VI channel identifier (or a request) to AllocateDoorbellPage process 442.

ViContext 426 may include entries for all network interfaces accessible to operating system 421. In that case, ViContext 426 need not provide space for storing the network interface handle for each VI channel identifier and VI channel identifiers used with one network interface handle are not used with any other network interface handle. In an alternate implementation, each network interface may use the same VI channel identifier (e.g., channel # 1) and ambiguity is avoided by using the network interface handle with each reference to a VI channel.

For convenience, security, and speed commands for control program 441 are organized in groups called doorbell pages. Each page corresponds to a series of contiguous I/O addresses such as is managed by MMU 218. Each page is exclusively used with one VI channel identifier. In this way a uniform set of commands is available for any VI channel and any command of the set may be used exclusively to affect one VI channel. For example, AllocateDoorbellPage process 442 determines a unique VI# and returns to MakeViContext process 425 a doorbell physical page number (DbPP#) that is not currently in use for any other VI#. Process 442 may verify that a provided VI# is unique by making a query of DbMap 443; or, may determine a proposed VI#, assure its uniqueness, and return the VI# along with DbPP# in response to a request as discussed above.

In either case, AllocateDoorbellPage process 442 makes an association between the VI channel identifier and a set of commands for the control program. The process of making this association for a doorbell page that is not currently in use is called allocating the doorbell page. For example, process 442 may do any one or more of the following record a record having both VI# and DbPP# in a list and prepare indexes, post DbPP# in an array indexed by VI#, or post VI# in an array indexed by DbPP#.

On receipt of an allocated DbPP# MakeViContext process 425 registers DbPP# in MMU 218 to effect security. Further reference to DbPP# may then be limited to reference by a doorbell virtual page number (DbVP#) assigned by MMU 218. By registering the physical to virtual page translation in table 427, conventional operation of MMU 218 will permit only registered processes to use the DbPP# for registered purposes. For example, MMU 218 makes a conventional entry in MMU table 427 that associates the DbPP# with a DbVP#. With this association, MMU 425 also associates a process identifier and a set of suitable access flags. Table 427 may have multiple associations to the same DbPP#/DbVP# association so as to permit multiple processes and multiple purposes. These associations accomplish registration of the doorbell virtual page to one or more processes for one or more purposes. Each process is registered with reference to a process identifier. The process identifier may be any process identifier, preferably a process identifier known by, corresponding to, or of application program 401 (e.g., any process related to creation of the Tag passed into process 425). Each purpose is registered with reference to an access flag (or code). An access flag is used to describe permitted (or impermissible) access to the DbPP#, for example write access as may be needed for providing a command to control program 441 via register I/O.

MakeViContext process 425, having received a DbVP# from MMU 218, makes or completes an entry in ViContext 426 by associating the password (from CreateVi process 404), VI# (e.g., from AllocateDoorbellPage process 442), DbPP# (from AllocateDoorbellPage process 442), and DbVP# (from table 427). MakeViContext process 425 passes the VI channel identifier and password to MakeQueueContext process 444. MakeQueueContext process 444 establishes an initial entry in TransmitQueueContext 445 and ReceiveQueueContext 446. The initial entry in each one includes the VI channel identifier (e.g., VI#), the doorbell physical page number (e.g., DbPP#), and the password (e.g., TAG). These data structures are discussed further below. Finally, MakeViContext process 425 passes the VI# and DbVP# back to CreateVi process 404.

CreatVi process 404 provides the VI channel identifier and doorbell virtual page number to application program 401 and associates these values in an entry in ViTable 430. The entry may include one or both of these values (e.g., VI# and DbVP#). ViTable 445 may be organized as an array indexed by either or both of these values. A single ViTable 430 may be globally accessible from any application program memory space for supporting multiple application programs and VI channels. Or, a ViTable 430 may exist in each application program memory space that uses VI communications. In the first alternative, all application programs may be using one instance of the processes that refer to the ViTable. In the second alternative, increased security is provided in that the address space for a first application program is practically inaccessible to a second application program.

A VI channel may be activated by application program 401 as a prerequisite to use of the channel for communication. Activation may be automatic in response to successful completion of the above context creation process when, for example, MakeViContext process 425 has access to application program address space 400 for making an entry in ViTable 430. Activation is accomplished by MakeConnection process 405. MakeConnection process 405 passes parameters to ActivateVi process 428. MakeConnection process 405 serves to isolate application program 401 from operating system functions and thereby provides modularity for platform independent software architecture. The parameters include the network interface handle, VI channel number, an address of the target host with which a VI channel is to be established, and a discriminator. When successful, ActivateVi process 428 returns status to MakeConection process 405 and application program 401 can proceed to use the VI channel.

ActivateVi process 428 provides timing, message sequencing, and protocol for establishing a VI channel. ActivateVi process 428 may be provided integral to an operating system having VI communication capability. ActivateVi process 428 passes messages, formed according to VI protocol to CallVi process 447. CallVi process 447 generally may use low level communication circuits of network interface 302 (e.g., serial transmitter 318 and serial receive 328) to transmit messages and receive replies until communication with the requested host is established. The discriminator value may be used by application program 401 for differentiating multiple communication attempts and by the target host for recognizing communications that are from the same source.

As a consequence of the functions and cooperations described above with reference to processes 403, 404, 423, 425, 442, 444, 405, 428, and 447 and related data structures, a VI channel is activated in a secure manner for use in a secure manner. For example, application program 401 as a practical matter does not have access to the VI channel via register I/O, inter alia, because register I/O commands are permitted only from the operating system kernel. It cannot directly issue commands to a network interface controller, inter alia, because none of the doorbell physical addresses are stored in addresses accessible to it, the doorbell virtual addresses are stored in application program address space as referenced by VIPL 402 functions, and the doorbell virtual addresses cannot be used except by the process that registers such an address (e.g., with an MMU).

As a practical matter, other application programs (not shown) cannot use a VI channel activated by a first application program 401. The MMU will not permit access to (or effect a command based on) a doorbell physical address by any other process than the process that registered the doorbell virtual address. Security checks performed by VIPL 402 will not permit access to data or VI channel functions by any process that does not have knowledge of the network interface handle, the password, the VI channel identifier, or the cross-reference between doorbell virtual page and doorbell physical page (e.g., stored in ViTable 430). On the other hand, the first application program may facilitate use by other application programs of the VI channel it activated by, for example, permitting conventional shared memory technologies or by explicitly passing relevant information to such other application programs. Such cooperation may require other processes to reregister doorbell virtual or physical addresses with the process identifiers of the other processes using conventional MMU functions and operating system calls.

To register host memory for use with a VI channel where physical memory addresses are secured (e.g., inaccessible as a practical matter), an application program may, inter alia, allocate any suitable number of blocks of memory in application program address space (e.g., BlockToSend 407 and/or BlockToReceive 408), provide the network interface handle, the password that has been associated with the intended VI channel identifier by CreateVi process 404, and any number of block specifications to RegisterHostMemory process 406. For both send and receive VI communication, application program 441, at a minimum, registers at least a BlockToSend 407, at least a BlockToReceive 408, a TransmitWorkQueue 410, and a ReceiveWorkQueue 413. Further, if reference will be made to some portion of a registered block, then application program 401 may register each portion to obtain a memory handle for that portion. For example, a portion of BlockToSend 407 may be registered in addition to registration of BlockToSend 407 as a whole. For each linked list of block descriptions in either TransmitWorkQueue 410 and ReceiveWorkQueue 413, the initial block description may be registered to obtain a separate memory handle.

Each block specification requested to be registered may have a block start address in application program address space and a block length. By providing a plurality of block specifications, conventional gather operations and scatter operations may be performed as discussed below. Blocks that are registered may be used for data to be sent (e.g., all or part of any BlockToSend 407), data to be received (e.g., all or part of any BlockToReceive 408), and for work queues (e.g., 410 and 413), as discussed below. The purpose of the data in a registered block may include use as data or use as program code by an application program or operating system, as desired. Security measures for accepting program code for installation, execution, or interpretation may be accomplished to any appropriate extent using conventional protocols within or external to the VI channel.

RegisterHostMemory process 406 may return a memory handle (e.g., MH) if the host memory is successfully registered. Knowledge of the memory handle is prerequisite to VI communication relative to the registered memory; therefore, an application program does not have access as a practical matter to registered memory of other applications. Also, use of a remotely handle facilitates communication without providing application program 401 with physical addresses of registered memory.

RegisterHostMemory process 406 passes all of its input parameters to PinBlock process 429. PinBlock process 429 calculates the number of pages to be registered (i.e. the number of pages of memory needed to provide storage for the entire block length requested) and registers each page in MMU 218 to effect security. Further reference to a page of the requested block may then be limited to referencing by a block virtual page number (e.g., BLK-N VP# referring to the Nth page of the requested block) assigned by MMU 218. By registering the physical to virtual page translation in table 427, conventional operation of MMU 218 will permit only registered processes to use the physical page number (e.g., BLK-N PP#) for registered purposes. For example, MMU 218 makes a conventional entry in MMU table 427 that associates each BLK-1..N PP# respectively with a BLK-1..N VP#. With this association, MMU 218 also associates a process identifier and a set of suitable access flags. Table 427 may have multiple associations to the same BLK-N PP#/BLK-N VP# association so as to permit multiple processes and multiple purposes. These associations accomplish registration of the block virtual page to one or more processes for one or more purposes. Each process is registered with reference to a process identifier. The process identifier may be any process identifier; preferably a process identifier known by, corresponding to, or of application program 401 (e.g., any process related to creation of the Tag passed into process 425). Each purpose is registered with reference to an access flag (or code). An access flag is used to describe permitted (or impermissible) access to the BLK-N PP#, for example write access as may be needed to complete a command of control program 441.

To facilitate application program reference to a registered block without knowledge of the physical address of the block, and with security from other application programs gaining unsuitable access to the registered block, PinBlock process 429, for each registered page (e.g., BLK-N), passes the password (e.g., TAG) and the physical address (BLK-N PP#) to ManageAPT process 448.

ManageAPT process 448 makes an association between the password, the block physical address, the block virtual address, and a memory handle. A memory handle may be any reference including an integer, a character string, or a conventional object reference. A memory handle may include indicia of the VI channel identifier or doorbell page with which the other data items are intended to be used. For example, ManageAPT process 448 may make an entry in AddressProtection table 449 (APT). The entry may include, in addition to the associated items listed above, a validity flag. When a VI channel will no longer be used as originally intended (e.g., application program 401 is terminated in any manner) an entry in APT 448 may be marked as no longer in use by resetting a validity flag. By retaining the item with a reset invalidity flag, subsequent communication attempts, whether to send or receive on the VI channel, may be blocked and reported as may be desirable to identifies the source of inchoate communications or track security threats.

ManageAPT process 448 determines a memory handle and returns it to PinBlock process 429. The memory handle is preferably unique to each association of password, block virtual address, and block physical address. APT 449 may be indexed by a calculated value herein called AptIndex. For example, with knowledge of the memory handle and a virtual address (e.g., of a doorbell page, a block to send, a block descriptor, etc), an entry in APT 449 may be quickly retrieved by deriving AptIndex from memory handle and virtual address. ManageApt process 448 assigns a memory handle (MH) and returns the assigned value to PinBlock process 429. PinBlock process 429 returns he memory handle to RegisterHostMemory process 406 for use by application program 402.

Figure 5:
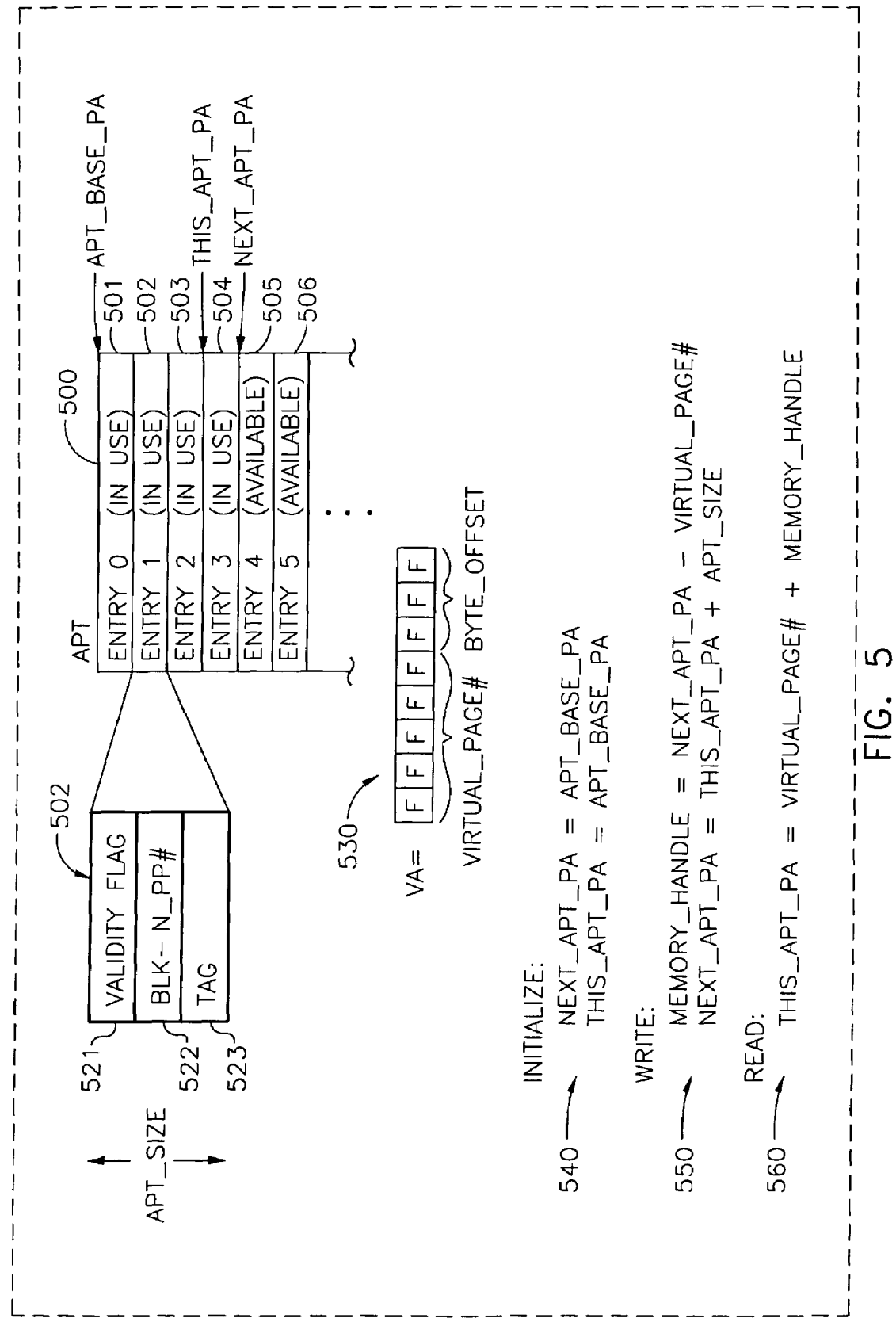
FIG. 5 is a data structure diagram according to various aspects of the present invention.

An AddressProtection table (APT) according to a preferred implementation is accessed for read and write operations without some of the complexity of conventional array index arithmetic. To access a conventional array, the size of the entry is multiplied by the desired entry ordinal (e.g., fifth entry is 5*(entry_size)). According to various aspects of the present invention, access to an APT may be made without multiplication. For example, APT 500 of FIG. 5 represents a conventional data structure (e.g., a memory map) and includes entries 501-505 and any number of additional entries in space 506. Each entry (e.g., 502) may include a unit data structure having three data items: indicia 521 of whether this entry is in use (e.g., VALIDITY_FLAG), the physical address 522 of a registered block of host memory 220, (BLK-N_PP#), and a password 523 (e.g. TAG). Each entry may occupy a contiguous address space of data structure 500 having an extent of APT_SIZE (e.g. 16 bytes). APT 500 may occupy a contiguous address space in interface memory 308 beginning at a physical address (e.g., APT_BASE_PA). A particular entry 504 (e.g., ENTRY 3) that has already been written (e.g., the associated flag 521 is set) may exist at a physical address (e.g., THIS_APT_PA) corresponding to APT_BASE_PA+3*APT_SIZE. A particular unwritten entry may exist at a physical address (e.g., NEXT_APT_PA) corresponding to THIS_APT_PA+APT_SIZE. Initially, when no entries are in use, both THIS_APT_PA and NEXT_APT_PA are set to APT_BASE_PA.

A write operation of APT 500 may include the computation of a memory handle to be passed back to the calling process as discussed above. When the calling process supplies a virtual address (e.g., VA), a suitable memory handle may be calculated as follows: (a) determine the virtual page number (e.g., VIRTUAL_PAGE#) from a portion of the VA (e.g., for a 32 bit virtual address, and a 4 Kbyte page size, the leftmost 20 bits may be right-shifted 12 places to provide a VIRTUAL_PAGE#), (b) assign the difference, NEXT_APT_PA minus VIRTUAL_PAGE#, to the memory handle (e.g., MEMORY_HANDLE); and (c) calculate the physical address of the next APT entry (e.g., NEXT_APT_PA) by adding the current entry physical address (e.g., THIS_APT_PA) and the entry size (e.g.,APT_SIZE).

A read operation of APT 500 may be completed without multiplication. For example, to read Entry 3 the physical address of entry 504 may be calculated from the sum of a provided memory handle (e.g., MEMORY_HANDLE) and a provided virtual address (e.g., VA) as follows: (a) determine the virtual page number (e.g., VIRTUAL_PAGE#) from a portion of the VA (e.g., for a 32 bit virtual address, and a 8Kbyte page size, the leftmost 20 bits may be right-shifted 12 places to provide a VIRTUAL_PAGE#); and (b) assign a value to THIS_APT_PA as VIRTUAL_PAGE# plus MEMORY_HANDLE.

To describe blocks of host memory with reference to a memory handle, application program 401 may, inter alia, provide to DescribeBlockToSend process 409 (or DescribeBlockToReceive process 412) a control value, an immediate data value, a block start address in application program address space, a block length, and the memory handle obtained from Register process 406, discussed above. DescribeBlockToSend process 409 (or DescribeBlockToReceive process 412) may return a virtual address of a block description (e.g., VA BTSD for virtual address of a block to send description, and similarly VA BTRD for receive). Each block description comprises sufficient information to prepare messages for VI communication (send or receive). Preferably, block descriptions are organized in a work queue to maintain a sequence of transfers. Access to the work queue may be for preparing messages for one block description at a time; or because queue entries may refer to each other in a linked list, access may be for preparing a series of messages for a series of block descriptions (e.g., a gather operation or a scatter operation).

TransmitWorkQueue 410 provides storage for block descriptions. Access to one or more block descriptions stored in TransmitWorkQueue 410 may be by the physical address of the block description (e.g., PA BTSD or PA BTRD). An entry in TransmitWorkQueue 410 may associate the following values as passed into DescribeBlockToSend process 409: a control value (CONTROL), an immediate data value (IMMEDIATE), a block start address (BLOCK START VA as described above with reference to process 406), a block length (BLOCK LENGTH as described above with reference to process 406), a memory handle (MH), and a pointer to the next block description (NEXT DESCRIPTOR) in a series of block descriptions. Block descriptions are not stored with reference to VI channel identifiers and so the same block description may be conveniently used with more than one VI channel.

DescribeBlockToReceive process 412 and ReceiveWorkQueue 413 operate in a manner analogous to DescribeBlockToSend process 409 and TransmitWorkQueue 410, discussed above.

To accomplish data communication via an established VI channel where the data and controls of other VI channels are secured (e.g, inaccessible as a practical matter) application program may at any time and from time to time initiate the sending or receiving of a described block of host memory. To initiate sending, the application program 401 may, inter alia, provide to PostToSend process 411 the VI channel identifier provided by CreateVi process 404, the memory handle provided by RegisterHostMemory process 406, and the virtual address of the BlockToSendDescriptor of TransmitWorkQueue 410 that was associated with the memory handle by DescribeBlockToSend process 409. On successful completion of PostToSend process 411, application program 401 may take further action on the assumption that the information associated with these parameter values will eventually be communicated over the virtual interface. To initiate receiving, application program 401 may, inter alia, provide to PostToReceive process 414 the VI channel identifier provided by Create Vi process 404, the memory handle provided by RegisterHostMemory process 406, and the virtual address of the BlockToReceiveDescriptor of TransmitWorkQueue 413 that was associated with the memory handle by DescribeBlockToReceive process 412. On successful completion of PostToReceive process 411, application program 401 may (a) poll status of network interface control program 441 through a suitable doorbell command until status indicates receiving is complete; or (b) poll status of the work queue until reception of a suitable amount of data is indicated.

PostToSend process 411 receives the VI channel identifier, memory handle, and virtual address of a block description from application program 401. PostToSend process 411 identifies a suitable command for directing network interface control program 441 with reference to the VI channel identifier. A suitable doorbell command may include information sufficient for control program 441 to perform various security checks prior to initiating VI communication. Process 411 may use a register I/O write operation as described above with reference to Table 1. For example, the write address may refer to a doorbell page virtual address and an offset. The offset may be used as an operation identifier. The write data may refer to a memory handle and a virtual address of the block to send description. Preferably, process 411 makes a query of ViTable 430 based on VI# (received from application program 401) to obtain a corresponding doorbell virtual page number (DbVP#) as stored there by CreateVi process 404; and calculates an AptIndex value from the MH and VA BTSD values passed to it by application program 401. When the register I/O write operation is performed, MMU 218 converts the DbVP# to a DbPP# and passes the operation identifier and the write data without modification to the DbPP# of the appropriate network controller.

Security checks made by a network interface control program may inhibit completion of commanded actions when a breach of security is indicated. Security checks may include one or more of the following three in any order: (1) verify that the queue context for the commanded option is consistent with the scope of the command received; (2) verify that the registered host memory to be read or written by the VI communication is still in use; and (3) verify that the registered host memory to be read or written by the VI communication is associated with the same password that has been associated with the queue context for the commanded operation.

In the implementation illustrated by way of example, for the first check, ReviseQueueContext process 450 determines which queue context corresponds to the type of the current command: TransmitQueueContext 445 or ReceiveQueueContext 446. A breach of security is indicated if no such queue context exists. Process 450 uses the DbPP# of the current command to obtain a record from the queue context for that type of command (445 or 446). A breach of security is indicated if no record exists.

For the second check, ReviseQueueContext process 450 uses the AptIndex provided by process 411 to obtain by query of APT 449 a ValidityFlag A breach of security is indicated if no record for the AptIndex is located in APT 449. A breach of security is indicated if the ValidityFlag indicates the registered host memory is not in use.

For the third check, ReviseQueueContext process 450 examines the queue context record retrieved in the first check to obtain a first TAG value that was associated with the DbPP#. Process 450 then uses the record obtained in the second check to obtain a second TAG value associated with the AptIndex. A breach of security is indicated if the first TAG value does not match the second TAG value.

ReviseQueueContext process 450 examines the record obtained in the second check to obtain the physical address of the block. The value of AptIndex passed to process 450 is based on the virtual address of a block description (BlockToSendDescriptor VA BTSD or BlockToReceiveDescriptor VA BTRD). Therefore, the record obtained from APT 449 will indicate the physical address of the block description (PA BTSD or PA BTRD). If security checks all pass, then process 450 revises the queue context record (445 or 446) to associate the physical address (PA BTSD or PA BTRD) with the VI channel identifier (VI#). Finally process 450 places the VI# in the appropriate queue (TransmitQueue 451 or ReceiveQueue 458) to direct Schedule process 452 or Steer process 459 to take action relative to the subject block description.

TransmitQueue 451 may be organized as a conventional list of VI#s. When all work associated with the subject block description in TransmitWorkQueue 410 has been completed, the VI# may be removed from the list in TransmitQueue 451. Alternately, TransmitQueue 451 may be an array having a flag for each VI channel identifier. Instead of adding and removing a VI# from a list, a flag is set or reset. Dedicated flag storage may occupy less space than a list of VI#s on a busy system. ReceiveQueue 458 may be organized in a manner similar to TransmitQueue 451.

A VI channel may be used for one send operation at a time. Multiple send operations may have been identified either by linking multiple BTSDs together in TransmitWorkQueue 410 as discussed above or by posting several VA BTSDs several VI channels via multiple calls to PostToSend process 411. Each send operation is handled in turn by cooperation of Schedule process 452 and DirectTransmitDMA process 452. Schedule process 452 scans TransmitQueue 451 for indicia of VI channels needing service and awaits indication of an idle DMA circuit (e.g., 314). When a DMA circuit is idle (as indicated by process 453 or in any conventional manner) and a VI channel needs service (as indicated by an entry in TransmitQueue 451), Schedule process 452 passes a suitable VI channel identifier (e.g., VI#) to DirectTransmitDMA process 453. When more than one VI channel needs service, Schedule process 452 may choose a channel for process 453 based on rank order of VI#, indicia of time of posting into TransmitQueue 451 (e.g., to implement first come first serve), or with reference to a table (not shown) of priorities established and/or maintained, for example, by CreateVi process 404 and/or MakeConnection process 405 (or a corresponding process in VIKA 422). Writing to such a priority table may be accomplished via the doorbell mechanism discussed above or by conventional register I/O.

A transmitting VI communication is implemented according to various aspects of the present invention using direct memory access (DMA) and a security check for each such access. For example, DirectTransmitDMA process 453 controls DMA circuit 314 (e.g., by register I/O operations) to provide data to Frame process 454. Process 453 may report idle status to Schedule process 452, as discussed above. When Schedule process 452 passes a VI channel identifier to DirectTransmitDMA process 453, process 453: (a) uses VI# to query TransmitQueueContext 445 to obtain PA BTSD and a first TAG; (b) uses PA BTSD to read TransmitWorkQueue 410 to obtain MH, BlockStart VA, and BlockLength; (c) uses MH and BlockStart VA to calculate an AptIndex; (d) uses the AptIndex to query APT 449 and obtain ValidityFlag, a second TAG value, and Blk-N PP# (this Blk-N PP# corresponds to PA BTS; (e) cancels the DMA action if the ValidityFlag is not set; (f) cancels the DMA action if the first TAG value does not match the second TAG value; (g) reads BlockToSend 407 according to the PA BTS; (h) passes the contents of the block description and block to send to Frame process 454; (i) subtracts the size of physical pages already sent from BlockLength to calculate a difference; and (j) repeats steps (c) through (i) until the difference is zero. When at step (g) a page boundary is crossed, steps (c) through (f) may be repeated with a suitable adjustment to BlockStart VA to effect security measures for each page.

In an implementation where transmit direct memory access circuit 314 comprises multiple independent DMA channels, Schedule process 452 determines the idle/busy status of each DMA channel and activates an idle channel for suitable items from TransmitQueue 451.

Frame process 454 controls framer 316 using register I/O operations. Data received from DirectTransmitDMA process 453 may include indicia of framing protocol (e.g., whether the data is part of a message header, part of a message body, etc.). Frame process 454 may determine in any conventional manner bits to prefix or suffix each unit of data to be transmitted. Frames may include indicia of the receiving end VI channel number for identification at the receiving end. Frame process 454 may also determine (e.g., by calculation or by I/O to dedicated circuitry) any conventional error checking and/or correction code(s) to be sent with the data provided by process 453. Frame process 454 may control memory preceding or following framing circuitry (e.g., pipeline registers). Frame process 454 may comprise multiple independent channels used in series with DMA channels discussed above. When the transmitting protocol permits intermixed message packets from simultaneous VI channels, frame process 454 may direct any frame circuit channel to service multiple DMA channels. Frame process directs framer to provide transmitted packets onto network 202 according to any suitable VI channel protocol.

PostToReceive process 414 cooperates with ReviseQueueContext process 450 in a manner analogous to the cooperation of PostToSend process 411 and ReviseQueueContext process 450, as discussed above.

A receiving VI communication is implemented according to various aspects of the present invention using a parser and direct memory access (DMA) and a security check for each such access. For example, Parse process 456 controls parser circuit 326 using register I/O operations. Parse process 456 directs parser circuit 326 to receive packets from network 202 according to any suitable VI channel protocol. Data received from network 202 may include indicia of VI channel number. Parse process 456 may determine in any conventional manner bits to be stripped from the prefix or suffix of each unit of data received. Parse process 456 may also determine (e.g., by calculation or by I/O to dedicated circuitry) any conventional error checking and/or correction code(s) and correct or reject bad packets. Parse process may cooperate with other processes to initiate retransmission of bad packets (e.g., using conventional communications techniques to suppress sending an acknowledge (ACK) message, initiate sending a negative acknowledgement message (NACK), or initiate a request for retransmission of one or more packets (GO-BACK-N)). Parse process 456 may make entries in ReceiveQueue 458 based on deriving VI channel number from a received packet and may control memory preceding or following parser circuitry 326 (e.g., pipeline registers). Parse process 456 may comprise multiple independent channels used in series with DMA channels discussed above. When the receiving protocol permits intermixed message packets from simultaneous VI channels, parse process 456 may direct any parse circuit channel to provide data to one or more DMA channels.

DirectReceiveDMA process 457 controls DMA circuit 328 (e.g., by register I/O operations) to store data received from Parse process 459. Process 457 may report idle status to Steer process 459, as discussed above. When Steer process 459 notes a VI channel identifier posted in ReceiveQueue 458, Steer process 459 passes suitable information DirectReceiveDMA process 457. Process 457 then: (a) uses VI# to query ReceiveQueueContext 446 to obtain PA BTRD and a first TAG; (b) uses PA BTRD to read ReceiveWorkQueue 413 to obtain MH, BlockStart VA, and BlockLength; (c) uses MH and BlockStart VA to calculate an AptIndex; (d) uses the AptIndex to query APT 449 and obtain ValidityFlag, a second TAG value, and Blk-N PP# (this Blk-N PP# corresponds to PA BTR; (e) cancels the DMA action if the ValidityFlag is not set; (f) cancels the DMA action if the first TAG value does not match the second TAG value; (g) reads BlockToReceive 408 according to the PA BTR; (h) stores data from Parse process 456 in the block description and block to receive; (i) subtracts the size of physical pages already received from BlockLength to calculate a difference; and (j) repeats steps (c) through (i) until the difference is zero. When at step (g) a page boundary is crossed, steps (c) through (f) may be repeated with a suitable adjustment to BlockStart VA to effect security measures for each page.

The foregoing description discusses preferred embodiments of the present invention which may be changed or modified without departing from the scope of the present invention as defined in the claims. While for the sake of clarity of description, several specific embodiments of the invention have been described, the scope of the invention is intended to be measured by the claims as set forth below.

What is claimed is:

1. A data structure maintained in a network interface, the network interface for installation in a host computer, the data structure comprising:
   a. a plurality of entries, each entry comprising:
      (1) a physical address of a page of memory of the host computer;
      (2) a password; and
      (3) a validity flag; wherein
   b. entries in the data structure are addressable by an index value, the index value being determined in accordance with a sum of a memory handle and a virtual address of a page of memory of the host computer, the virtual address corresponding to the physical address.

2. A data structure maintained in a network interface, the network interface for installation in a host computer, the network interface for data communication via a plurality of channels, the data structure comprising:
   a. a plurality of entries, each entry comprising:
      (1) a first physical I/O address of the host computer, the first physical I/O address for addressing the network interface.
      (2) a password; and
      (3) a second physical memory address of the host computer, the second physical for identifying data for communication by the network interface, wherein
   b. entries in the data structure are addressable by a channel identifier, the channel identifier for identifying a particular channel of the plurality of channels for data communication.

* * * * *

UNITED STATES PATENT AND TRADEMARK OFFICE
CERTIFICATE OF CORRECTION

PATENT NO. : 7,389,399 B2
APPLICATION NO. : 11/070858
DATED : June 17, 2008
INVENTOR(S) : William C. Terrell et al.

It is certified that error appears in the above-identified patent and that said Letters Patent is hereby corrected as shown below:

On the Title Page, Item (57), under "Abstract", line 18, after "communications" insert -- function --.

In column 1, line 22, after "program" insert -- . --.

In column 1, line 52, after "conditions" insert -- . --.

In column 3, line 24, delete "s" and insert -- structure --, therefor.

In column 4, line 29-30, delete "network, 102," and insert -- network 102, --, therefor.

In column 6, line 15, delete "m" and insert -- in --, therefor.

In column 6, line 22, delete "or" and insert -- for --, therefor.

In column 7, line 52, delete "seperate" and insert -- separate --, therefor.

In column 8, line 56, after "includes" insert -- processor --.

In column 8, line 62, delete "functions of the" and insert -- function of these --, therefor.

In column 8, line 67, delete "password" and insert -- password; --, therefor.

In column 9, line 48, delete "transmit" and insert -- transmitting --, therefor.

In column 9, line 61, after "address" insert -- ; --.

In column 10, line 62, after "instructions" insert -- , --.

In column 11, line 17, delete "position" and insert -- portion --, therefor.

In column 13, line 1, delete "First" and insert -- circuit --, therefor.

Signed and Sealed this

Eleventh Day of May, 2010

David J. Kappos
*Director of the United States Patent and Trademark Office*

CERTIFICATE OF CORRECTION (continued)
U.S. Pat. No. 7,389,399 B2

In column 13, line 6, after "318" insert -- receives --.

In column 14, line 49, delete "sync" and insert -- system --, therefor.

In column 14, line 50, delete "systems" and insert -- system --, therefor.

In column 15, line 3, delete "MakeQueucContext" and insert -- MakeQueueContext --, therefor.

In column 15, line 13, delete "Receivequeue 458." and insert -- ReceiveQueue 458. --, therefor.

In column 15, line 59, delete "identifier;" and insert -- identifier, --, therefor.

In column 16, line 33, delete "identifier" and insert -- identifier, --, therefor.

In column 17, line 52, delete "CreatVi" and insert -- Create Vi --, therefor.

In column 17, line 56, delete "445" and insert -- 430 --, therefor.

In column 18, line 26, delete "receive" and insert -- receiver --, therefor.

In column 19, line 43, delete "remotely" and insert -- memory --, therefor.

In column 20, line 2, delete "identifier;" and insert -- identifier, --, therefor.

In column 20, line 33, delete "identifies" and insert -- identify --, therefor.

In column 20, line 46, delete "he" and insert -- the --, therefor.

In column 20, line 63, delete "220, (BLK-N_PP#)," and insert -- 220 (BLK-N_PP#), --, therefor.

In column 21, line 17, delete "VIRTUAL_PAGE#)," and insert -- VIRTUAL_PAGE#); --, therefor.

In column 21, line 24, delete "Entry 3" and insert -- entry 3, --, therefor.

In column 21, line 31, delete "8Kbyte" and insert -- 4Kbyte --, therefor.

In column 22, line 65, delete "option" and insert -- operation --, therefor.

In column 23, line 17, after "ValidityFlag" insert -- . --.

In column 23, line 44, delete "V1#s." and insert -- VI#s. --, therefor.

In column 23, line 57, after "BTSDs" insert -- on --.

In column 25, line 31, delete "328" and insert -- 324 --, therefor.

In column 25, line 35, after "information" insert -- to --.